(12) United States Patent
Porat et al.

(10) Patent No.: US 11,871,367 B2
(45) Date of Patent: *Jan. 9, 2024

(54) FRAME FORMATS FOR DISTRIBUTED MIMO

(71) Applicant: Avago Technologies International Sales Pte. Limited, Singapore (SG)

(72) Inventors: Ron Porat, San Diego, CA (US); Srinath Puducheri Sundaravaradhan, San Jose, CA (US); Karim Nassiri Toussi, Belmont, CA (US); Jun Zheng, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,926

(22) Filed: May 20, 2022

(65) Prior Publication Data
US 2022/0279465 A1 Sep. 1, 2022

Related U.S. Application Data

(63) Continuation of application No. 16/551,429, filed on Aug. 26, 2019, now Pat. No. 11,363,549.
(Continued)

(51) Int. Cl.
*H04W 56/00* (2009.01)
*H04B 7/0413* (2017.01)
(Continued)

(52) U.S. Cl.
CPC ........ *H04W 56/001* (2013.01); *H04B 7/0413* (2013.01); *H04B 7/0617* (2013.01); *H04W 72/0446* (2013.01); *H04W 92/20* (2013.01)

(58) Field of Classification Search
CPC ........ H04B 7/08; H04B 7/024; H04B 7/0617; H04B 7/0413; H04W 56/001; H04W 72/0446; H04W 92/20; H04W 56/0015
See application file for complete search history.

(56) References Cited

U.S. PATENT DOCUMENTS 10,009,736 B1 6/2018 Chu et al.
11,363,549 B2 * 6/2022 Porat ................. H04W 72/0446
(Continued)

FOREIGN PATENT DOCUMENTS

CN 104604325 A 5/2015
WO WO-2014/066785 A1 5/2014
(Continued)

OTHER PUBLICATIONS

"Jamming Resilient Communication Using MIMO Interference Cancellation"; Yan et al.; IEEE Transactions on Information Forensics and Security, vol. 11, No. 7, Jul. 2016 (Year: 2016).*
(Continued)

*Primary Examiner* — Benjamin H Elliott, IV
(74) *Attorney, Agent, or Firm* — Foley & Lardner LLP

(57) ABSTRACT

Disclosed herein are related to systems and methods for a multiple-input multiple-output (MIMO) communication. In one aspect, during a first time period, a master access point transmits, to a slave access point, information for a joint transmission by the master access point and the slave access point. In one aspect, the slave access point estimates synchronization information for the joint transmission, according to the information for the joint transmission. In one aspect, during a second time period after the first time period, the master access point transmits a portion of a null data packet to a station device. In one aspect, during the second time period, the slave access point transmits the portion of the null data packet to the station device, based on the synchronization information for the joint transmission.
(Continued)

In one aspect, the station device determines steering information for the MIMO communication, according to the null data packet.

23 Claims, 17 Drawing Sheets

Related U.S. Application Data

(60) Provisional application No. 62/828,874, filed on Apr. 3, 2019, provisional application No. 62/805,821, filed on Feb. 14, 2019, provisional application No. 62/724,294, filed on Aug. 29, 2018.

(51) Int. Cl.
*H04B 7/06* (2006.01)
*H04W 72/0446* (2023.01)
*H04W 92/20* (2009.01)

(56) References Cited

U.S. PATENT DOCUMENTS

| | | |
|---|---|---|
| 2010/0104033 A1 | 4/2010 | Gorokhov |
| 2010/0173660 A1 | 7/2010 | Liu et al. |
| 2011/0069688 A1 | 3/2011 | Zhang et al. |
| 2011/0310827 A1 | 12/2011 | Srinivasa et al. |
| 2014/0056205 A1 | 2/2014 | Aboul-Magd et al. |
| 2015/0295629 A1 | 10/2015 | Xia et al. |
| 2016/0164594 A1 | 6/2016 | Shapira et al. |
| 2016/0242188 A1 | 8/2016 | Tiirola et al. |
| 2018/0167903 A1 | 6/2018 | Fan et al. |
| 2019/0007115 A1 | 1/2019 | Luong et al. |
| 2019/0028168 A1 | 1/2019 | Vermani et al. |
| 2019/0045366 A1 | 2/2019 | Vermani et al. |
| 2019/0081664 A1 | 3/2019 | Vermani et al. |
| 2019/0132762 A1 | 5/2019 | Zhu et al. |
| 2020/0059808 A1 | 2/2020 | Lim et al. |
| 2020/0076665 A1 | 3/2020 | Porat et al. |
| 2020/0077351 A1 | 3/2020 | Porat et al. |
| 2022/0279465 A1* | 9/2022 | Porat ............... H04W 56/0015 |

FOREIGN PATENT DOCUMENTS

| | | |
|---|---|---|
| WO | WO-2018/093132 A1 | 5/2018 |
| WO | WO-2019/051338 A1 | 3/2019 |

OTHER PUBLICATIONS

Extended European Search Report on EP 19193826.5 dated Jan. 24, 2020 (8 pages).
Foreign Action other than Search Report on non-Foley case related to U.S. Appl. No. 16/551,429 dated Dec. 11, 2020.
Non-Final Office Action on U.S. Appl. No. 16/551,445 dated Feb. 11, 2020.
Chinese Office Action on CN 20191080889.4 dated Jun. 10, 2023.

* cited by examiner

FRAME FORMATS FOR DISTRIBUTED MIMO

CROSS-REFERENCE TO RELATED APPLICATIONS

This application is a continuation application of U.S. patent application Ser. No. 16/551,429, filed Aug. 26, 2019, which claims priority to U.S. Provisional Patent Application No. 62/724,294, filed Aug. 29, 2018, U.S. Provisional Patent Application No. 62/805,821, filed Feb. 14, 2019, and U.S. Provisional Patent Application No. 62/828,874, filed Apr. 3, 2019, all of which are incorporated by reference in their entireties for all purposes.

FIELD OF THE DISCLOSURE

This disclosure generally relates to systems and methods for providing a joint transmission by a group of distributed access points, including but not limited to frame formats of a joint transmission for sounding and steering.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As higher data throughput and other changes develop, newer standards are constantly being developed for adoption, such as a progression from IEEE 802.11n to IEEE 802.11ac.

SUMMARY

Various embodiments of a method for a multiple-input multiple-output (MIMO) communication are disclosed herein. In some embodiments, the method includes transmitting, during a first time period, by a master access point to a slave access point, information for a joint transmission by the master access point and the slave access point. In some embodiments, the method includes estimating, by the slave access point, synchronization information for the joint transmission, according to the information for the joint transmission. In some embodiments, the method includes transmitting, during a second time period after the first time period, by the master access point, a portion of a null data packet to a station device. In some embodiments, the method includes transmitting, during the second time period, by the slave access point, the portion of the null data packet to the station device, based on the synchronization information for the joint transmission. In some embodiments, the method includes determining, by the station device, steering information for the MIMO communication, according to the null data packet.

In some embodiments, estimating, by the slave access point, the synchronization information includes estimating, by the slave access point, a carrier frequency offset or a sampling frequency offset with respect to the master access point. In some embodiments, the method includes transmitting, during a third time period before the first time period, by the master access point, a slave trigger frame to the slave access point. In some embodiments, the method includes estimating, by the slave access point, additional synchronization information for a null data packet announcement, according to the slave trigger frame. In some embodiments, the method includes transmitting, during a fourth time period between the third time period and the first time period, by the master access point, the null data packet announcement to the station device. In some embodiments, the method includes transmitting, during the fourth time period, by the slave access point, the null data packet announcement to the station device. In some embodiments, the method includes preparing, by the station device, for the null data packet, in response to receiving the null data packet announcement.

In some embodiments, transmitting, during the first time period, by the master access point to the slave access point, the information for the joint transmission, includes transmitting, by the master access point to the slave access point, the information for the joint transmission in a preamble of the null data packet. In some embodiments, transmitting, during the first time period, by the master access point to the slave access point, the information for the joint transmission, includes transmitting, by the master access point to the slave access point, the information for the joint transmission in a null data packet announcement. In some embodiments, the method further includes preparing, by the station device, for the null data packet, in response to the station device receiving the null data packet announcement. In some embodiments, the method further includes transmitting, during a third time period between the first time period and the second time period, by the master access point, a training field to the station device. In some embodiments, the method further includes transmitting, during the third time period, by the slave access point, the training field to the station device. In some embodiments, the method includes adjusting, by the station device, a gain setting to receive the portion of the null data packet, according to the training field.

Various embodiments of a first access point for a multiple-input multiple-output (MIMO) communication are disclosed herein. In some embodiments, the first access point includes a transceiver and a soundings controller. In some embodiments, the soundings controller is configured to cause, during a first time period, the transceiver to transmit, to a second access point, information for a joint transmission by the first access point and the second access point. In some embodiments, the information for the joint transmission allows the second access point to estimate synchronization information for the joint transmission. In some embodiments, the soundings controller is configured to cause, during a second time period after the first time period, the transceiver to transmit a portion of a null data packet to a station device, based on the synchronization information for the joint transmission. In some embodiments, the second access point transmits the portion of the null data packet to the station device. In some embodiments, the joint transmission of the portion of the null data packet by the first access point and the second access point allows the station device to determine steering information for the MIMO communication.

In some embodiments, the soundings controller is configured to cause the transceiver to transmit the portion of the null data packet in a training field. In some embodiments, the soundings controller is further configured to cause the transceiver to transmit, during a third time period before the first time period, a slave trigger frame to the second access point. In some embodiments, the slave trigger frame allows the second access point to estimate additional synchronization information for a null data packet announcement. In some embodiments, the soundings controller is further configured to cause the transceiver to transmit, during a fourth time period between the third time period and the first time period, the null data packet announcement to the station device, while the second access point transmits the null data packet announcement to the station device during the fourth time period according to the synchronization information. In some embodiments, the null data packet announcement transmitted by the first access point and the second access point allows the station device to prepare for the null data packet. In some embodiments, the soundings controller is further configured to cause the transceiver to transmit the information for the joint transmission in a preamble of the null data packet.

In some embodiments, the soundings controller is further configured to cause the transceiver to transmit the information for the joint transmission in a null data packet announcement. In some embodiments, the null data packet announcement allows the station device to prepare for the null data packet. In some embodiments, the soundings controller is further configured to cause the transceiver to transmit, during a third time period between the first time period and the second time period, a training field to the station device, while the second access point transmits the training field to the station device during the third time period. In some embodiments, the training field transmitted by the first access point and the second access point allows the station device to adjust a gain setting to receive the portion of the null data packet. In some embodiments, the soundings controller is further configured to cause the transceiver to transmit, during a third time period between the first time period and the second time period, a null data packet announcement to the station device, while the second access point transmits the null data packet announcement to the station device during the third time period according to the synchronization information. In some embodiments, the null data packet announcement transmitted by the first access point and the second access point allows the station device to prepare for the null data packet. In some embodiments, the information for the joint transmission includes two or more long training field (LTF) symbol groups that are separated by at least a symbol. In some embodiments, the second time period is immediately after the first time period.

Various embodiments disclosed herein are related to an access point for a multiple-input multiple-output (MIMO) communication. In some embodiments, the access point includes a transceiver and a soundings controller. In some embodiments, the soundings controller is configured to cause the transceiver to receive, during a first time period, from another access point, information for a joint transmission by the access point and the another access point. In some embodiments, the soundings controller is configured to estimate synchronization information for the joint transmission, according to the information for the joint transmission. In some embodiments, the soundings controller is configured to cause the transceiver to transmit, during a second time period after the first time period, a portion of a null data packet to a station device according to the synchronization information, while the another access point transmits the portion of the null data packet to the station device during the second time period. In some embodiments, the portion of the null data packet transmitted by the access point and the another access point allows the station device to determine steering information for the MIMO communication.

In some embodiments, the soundings controller is configured to cause the transceiver to transmit the portion of the null data packet in a training field. In some embodiments, the soundings controller is configured to estimate the synchronization information for the joint transmission by estimating a carrier frequency offset, a sampling frequency offset, a first reference value for a common phase offset, or a second reference value for a timing offset with respect to the another access point.

In some embodiments, the soundings controller is further configured to cause the transceiver to receive, during a third time period before the first time period, from the another access point, a slave trigger frame. In some embodiments, the soundings controller is further configured to estimate additional synchronization information for a null data packet announcement, according to the slave trigger frame. In some embodiments, the soundings controller is further configured to cause the transceiver to transmit, during a fourth time period between the third time period and the first time period, the null data packet announcement to the station device, while the another access point transmits the null data packet announcement to the station device during the fourth time period according to the synchronization information. In some embodiments, the null data packet announcement transmitted by the access point and the another access point allows the station device to prepare for the null data packet. In some embodiments, the soundings controller is configured to cause the transceiver to receive the information for the joint transmission in a preamble of the null data packet.

In some embodiments, the soundings controller is configured to cause the transceiver to receive the information for the joint transmission in a null data packet announcement. In some embodiments, the null data packet announcement allows the station device to prepare for the null data packet. In some embodiments, the soundings controller is configured to cause the transceiver to transmit, during a third time period between the first time period and the second time period, a training field to the station device, while the another access point transmits the training field to the station device during the third time period. In some embodiments, the training field transmitted by the access point and the another access point allows the station device to adjust a gain setting to receive the portion of the null data packet. In some embodiments, the soundings controller is configured to disable the transceiver during a third time period between the first time period and the second time period for a short interframe space. In some embodiments, the soundings controller is configured to cause the transceiver to transmit, during a third time period between the first time period and the second time period, a null data packet announcement to the station device, while the another access point transmits the null data packet announcement to the station device during the third time period according to the synchronization information. In some embodiments, the null data packet announcement transmitted by the access point and the another access point allows the station device to prepare for the null data packet. In some embodiments, the second time period is immediately after the first time period.

Various embodiments disclosed herein are related to a method for a multiple-input multiple-output (MIMO) communication. In some embodiments, the method includes transmitting, during a first time period, by a master access point to a slave access point, information for a joint transmission by the master access point and the slave access point. In some embodiments, the method includes causing, by the slave access point, the slave access point to estimate synchronization information for the joint transmission, according to the information for the joint transmission. In some embodiments, the method includes transmitting, during a second time period after the first time period, by the master access point, a portion of a steered frame to a station device. In some embodiments, the method includes transmitting, during the second time period, by the slave access point, the portion of the steered frame to the station device, based on the synchronization information for the joint transmission. In some embodiments, the method includes decoding, by the station device, the portion of the steered frame transmitted by the master access point and the slave access point to obtain content data in the portion of the steered frame.

In some embodiments, estimating, by the slave access point, the synchronization information includes estimating, by the slave access point, a carrier frequency offset or a sampling frequency offset with respect to the master access point. In some embodiments, the information for the joint transmission is transmitted in a slave trigger frame during the first time period.

In some embodiments, the steered frame transmitted by the master access point includes a mid-amble. In some embodiments, the method includes bypassing, by the slave access point, a transmission, while the master access point transmits the mid-amble of the steered frame. In some embodiments, the steered frame transmitted by the master access point includes a mid-amble. In some embodiments, the method further includes resynchronizing, by the slave access point, for another joint transmission of another portion of the steered frame by the master access point and the slave access point, according to the mid-amble.

In some embodiments, the method includes bypassing, during a third time period between the first time period and the second time period, by the master access point, a transmission for a short interframe space. In some embodiments, the method includes transmitting, during a third time period between the first time period and the second time period, by the master access point, a training field to the station device. In some embodiments, the method includes transmitting, during the third time period, by the slave access point, the training field to the station device. In some embodiments, the method includes adjusting, by the station device, a gain setting to receive the portion of the steered frame, according to the training field.

In some embodiments, the method includes transmitting, during a third time period after the first time period and the second time period, by the master access point to the slave access point, a null data packet. In some embodiments, the method includes resynchronizing, during the third time period, by the slave access point, for another joint transmission of another steered frame by the master access point and the slave access point. In some embodiments, the method includes transmitting, during a fourth time period after the third time period, by the master access point, the another steered frame to the station device. In some embodiments, the method includes transmitting, during the fourth time period, by the slave access point, the another steered frame to the station device. In some embodiments, the method includes decoding, by the station device, the another steered frame transmitted by the master access point and the slave access point to obtain additional content data in the another steered frame. In some embodiments, the method includes transmitting, during a fifth time period between the second time period and the third time period, by the station device to the master access point and the slave access point, an acknowledgement frame. In some embodiments, the method includes scheduling, by the master access point and the slave access point, the another joint transmission of the another steered frame, in response to the acknowledgement frame.

Various embodiments disclosed herein are related to a first access point for a multiple-input multiple-output (MIMO) communication. In some embodiments, the first access point includes a transceiver and a steering controller. In some embodiments, the steering controller is configured to cause the transceiver to transmit, during a first time period, to a second access point, information for a joint transmission by the first access point and the second access point. In some embodiments, the information for the joint transmission allows the second access point to estimate synchronization information for the joint transmission. In some embodiments, the steering controller is configured to cause the transceiver to transmit, during a second time period after the first time period, a portion of a steered frame to a station device, while the second access point transmits the portion of the steered frame to the station device according to the synchronization information. In some embodiments, the joint transmission of the portion of the steered frame by the first access point and the second access point allows the station device to receive the portion of the steered frame and decode the portion of the steered frame to obtain content data in the portion of the steered frame. In some embodiments, the second time period is immediately after the first time period.

In some embodiments, the information for the joint transmission is transmitted in a slave trigger frame during the first time period. In some embodiments, the steered frame transmitted by the first access point includes a mid-amble. In some embodiments, the second access point is configured to bypass a transmission, while the first access point transmits the mid-amble of the steered frame. In some embodiments, the steered frame transmitted by the first access point includes a mid-amble. In some embodiments, the mid-amble allows the second access point to resynchronize for another joint transmission of another portion of the steered frame by the first access point and the second access point. In some embodiments, the mid-amble allows the second access point to transition, during the transmission of the mid-amble by the first access point, from a transmit mode to a receive mode and transition back to the transmit mode for the another joint transmission of the another portion of the steered frame by the first access point and the second access point.

In some embodiments, the steering controller is configured to cause the transceiver to bypass, during a third time period between the first time period and the second time period, a transmission for a short interframe space. In some embodiments, the steering controller is configured to cause the transceiver to transmit, during the second time period, a training field to the station device, while the second access point transmits the training field to the station device during the second time period. In some embodiments, the training field transmitted by the first access point and the second access point allows the station device to adjust a gain setting to receive the portion of the steered frame.

In some embodiments, the steering controller is configured to cause the transceiver to transmit, during a third time period after the first time period and the second time period, a null data packet to the second access point. In some embodiments, the null data packet allows the second access point to resynchronize for another joint transmission of another steered frame by the first access point and the second access point. In some embodiments, the steering controller is configured to cause the transceiver to transmit, during a fourth time period after the third time period, the another steered frame to the station device, while the second access point transmits the another steered frame to the station device during the fourth time period after the resynchronizing. In some embodiments, the another steered frame transmitted by the first access point and the second access point allows the station device to receive the another steered frame and decode the another steered frame to obtain additional content data in the another steered frame. In some embodiments, the steering controller is configured to cause the transceiver to receive, during a fifth time period between the second time period and the third time period, from the station device an acknowledgement frame. In some embodiments, the steering controller is configured to schedule the another joint transmission of the another steered frame, in response to the acknowledgement frame. In some embodiments, the steering controller is configured to cause the transceiver to transmit a unique pilot sequence associated with the first access point to enable the station device to estimate additional synchronization information, and receive the additional synchronization information as a feedback.

Various embodiments disclosed herein are related to an access point for a multiple-input multiple-output (MIMO) communication. In some embodiments, the access point includes a transceiver and a steering controller. In some embodiments, the steering controller is configured to cause the transceiver to receive, during a first time period, from another access point, information for a joint transmission by the access point and the another access point. In some embodiments, the steering controller is configured to estimate synchronization information for the joint transmission, according to the information for the joint transmission. In some embodiments, the steering controller is configured to cause the transceiver to transmit, during a second time period after the first time period, a portion of a steered frame to a station device according to the synchronization information, while the another access point transmits the portion of the steered frame to the station device during the second time period. In some embodiments, the portion of the steered frame transmitted by the access point and the another access point allows the station device to receive the portion of the steered frame and decode the portion of the steered frame to obtain content data in the portion of the steered frame.

In some embodiments, the steering controller is configured to estimate the synchronization information for the joint transmission by estimating a carrier frequency offset, a sampling frequency offset, a first reference value for a common phase offset, or a second reference value for a timing offset with respect to the another access point. In some embodiments, the steering controller is configured to cause the transceiver to receive, during the first time period, from the another access point, the information for the joint transmission in a slave trigger frame. In some embodiments, the second time period is immediately after the first time period. In some embodiments, the steering controller is configured to determine the synchronization information according to a change in a phase offset or a timing offset between a sounding sequence and a steering sequence. In some embodiments, the steered frame transmitted by the another access point includes a mid-amble. In some embodiments, the steering controller is configured to cause the transceiver to bypass a transmission, while the another access point transmits the mid-amble of the steered frame. In some embodiments, the steering controller is configured to, during the transmission of the mid-amble by the another access point, resynchronize for another joint transmission of another portion of the steered frame by the access point and the another access point and transition, from a transmit mode to a receive mode and transition back to the transmit mode for the another joint transmission of the another portion of the steered frame by the access point and the another access point. In some embodiments, the steering controller is configured to cause the transceiver to transmit, during the second time period, a training field to the station device, while the another access point transmits the training field to the station device during the second time period. In some embodiments, the training field transmitted by the access point and the another access point allows the station device to adjust a gain setting to receive the portion of the steered frame. In some embodiments, the steering controller is configured to cause the transceiver to receive, during a third time period after the first time period and the second time period, a null data packet from the another access point. In some embodiments, the null data packet allows the access point to resynchronize for another joint transmission of another steered frame by the access point and the another access point. In some embodiments, the steering controller is configured to cause the transceiver to transmit, during a fourth time period after the third time period, the another steered frame to the station device after the resynchronizing, while the another access point transmits the another steered frame to the station device during the fourth time period. In some embodiments, the another steered frame transmitted by the access point and the another access point allows the station device to receive the another steered frame and decode the another steered frame to obtain additional content data in the another steered frame. In some embodiments, the steering controller is configured to cause the transceiver to receive, during a fifth time period between the second time period and the third time period, from the station device an acknowledgement frame. In some embodiments, the steering controller is configured to cause the transceiver to transmit a unique pilot sequence associated with the access point to enable the station device to estimate additional synchronization information, and receive the additional synchronization information as a feedback.

In some embodiments, the steered frame transmitted by the another access point includes a mid-amble. In some embodiments, the steering controller is configured to cause the transceiver to bypass a transmission, while the another access point transmits the mid-amble of the steered frame. In some embodiments, the steering controller is configured to cause the transceiver to resynchronize for another joint transmission of another portion of the steered frame by the access point and the another access point according to the mid-amble.

In some embodiments, the steering controller is configured to cause the transceiver to bypass, during a third time period between the first time period and the second time period, a transmission for a short interframe space. In some embodiments, the steering controller is configured to cause the transceiver to transmit, during a third time period between the first time period and the second time period, a training field to the station device, while the another access point transmits the training field to the station device during the third time period. In some embodiments, the training field transmitted by the access point and the another access point allows the station device to adjust a gain setting to receive the portion of the steered frame.

In some embodiments, the steering controller is configured to schedule the another joint transmission of the another steered frame, in response to the acknowledgement frame.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of frame formats of a joint transmission for sounding and steering in MIMO communication.

A. Computing and Network Environment

Figure 1A:
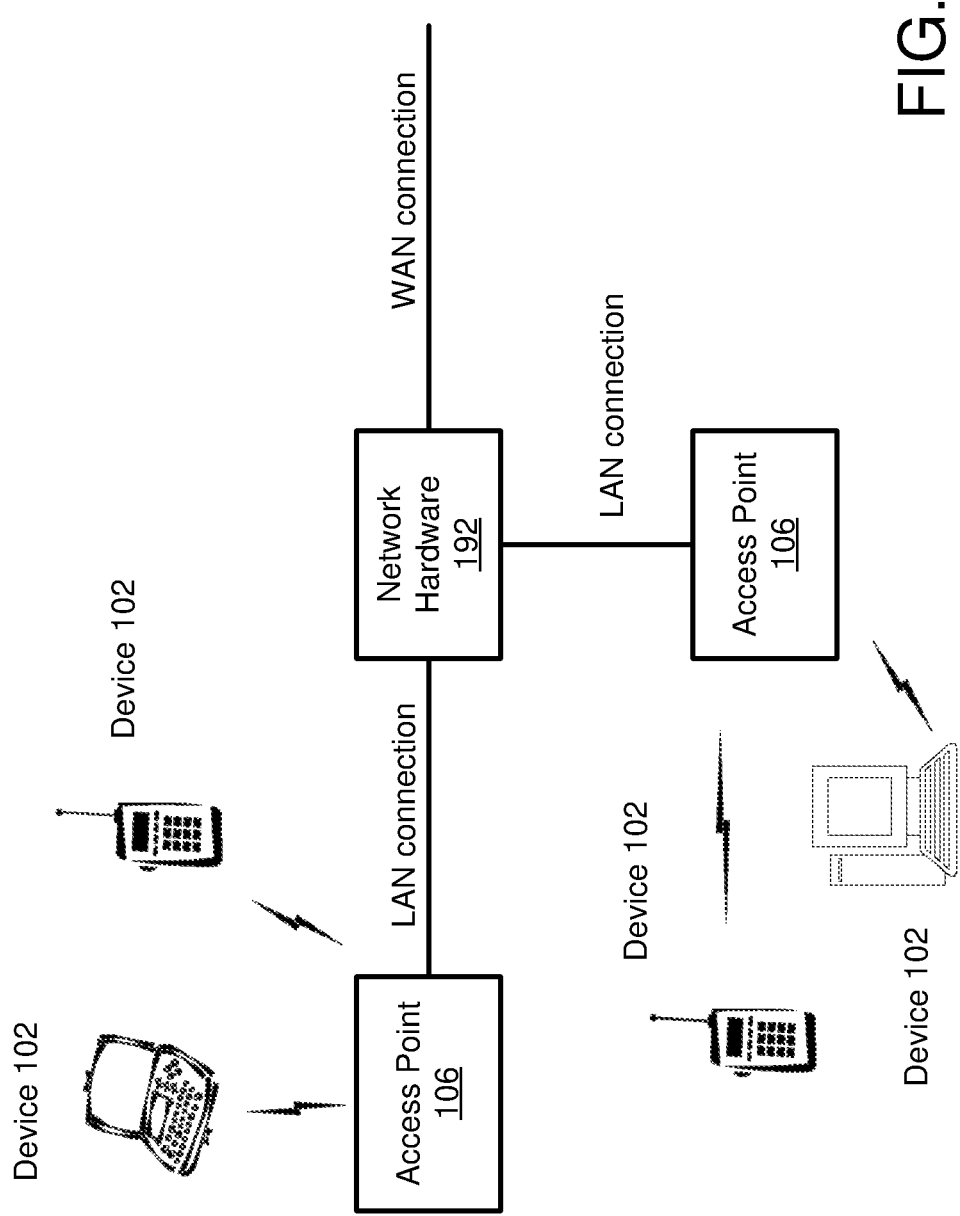
FIG. 1A is a block diagram depicting a network environment including one or more access points in communication with one or more devices or stations, according to some embodiments.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102, and/or cellular telephone devices 102. The details of an embodiment of each wireless communication device 102 and/or AP 106 are described in greater detail with reference to FIGS. 1B and 1C. The network environment can be an ad hoc network environment, an infrastructure wireless network environment, a subnet environment, etc., in one embodiment. The APs 106 can be operably coupled to the network hardware 192 via local area network connections. The network hardware 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices 102 can register with a particular AP 106 to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to AP 106.

In some embodiments an AP 106 includes a device or module (including a combination of hardware and software) that allows wireless communication devices 102 to connect to a wired network using wireless-fidelity (WiFi), or other standards. An AP 106 can sometimes be referred to as a wireless access point (WAP). An AP 106 can be implemented (e.g., configured, designed and/or built) for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provide wireless connections using radio frequency links for other devices 102 to utilize that wired connection. An AP 106 can be implemented to support a standard for sending and receiving data using one or more radio frequencies. Those standards, and the frequencies they use can be defined by the IEEE (e.g., IEEE 802.11 standards). An AP 106 can be configured and/or used to support public Internet hotspots, and/or on a network to extend the network's Wi-Fi signal range.

In some embodiments, the access points 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points 106.

The network connections can include any type and/or form of network and can include any of the following: a point-to-point network, a broadcast network, a telecommunications network, a data communication network, and a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
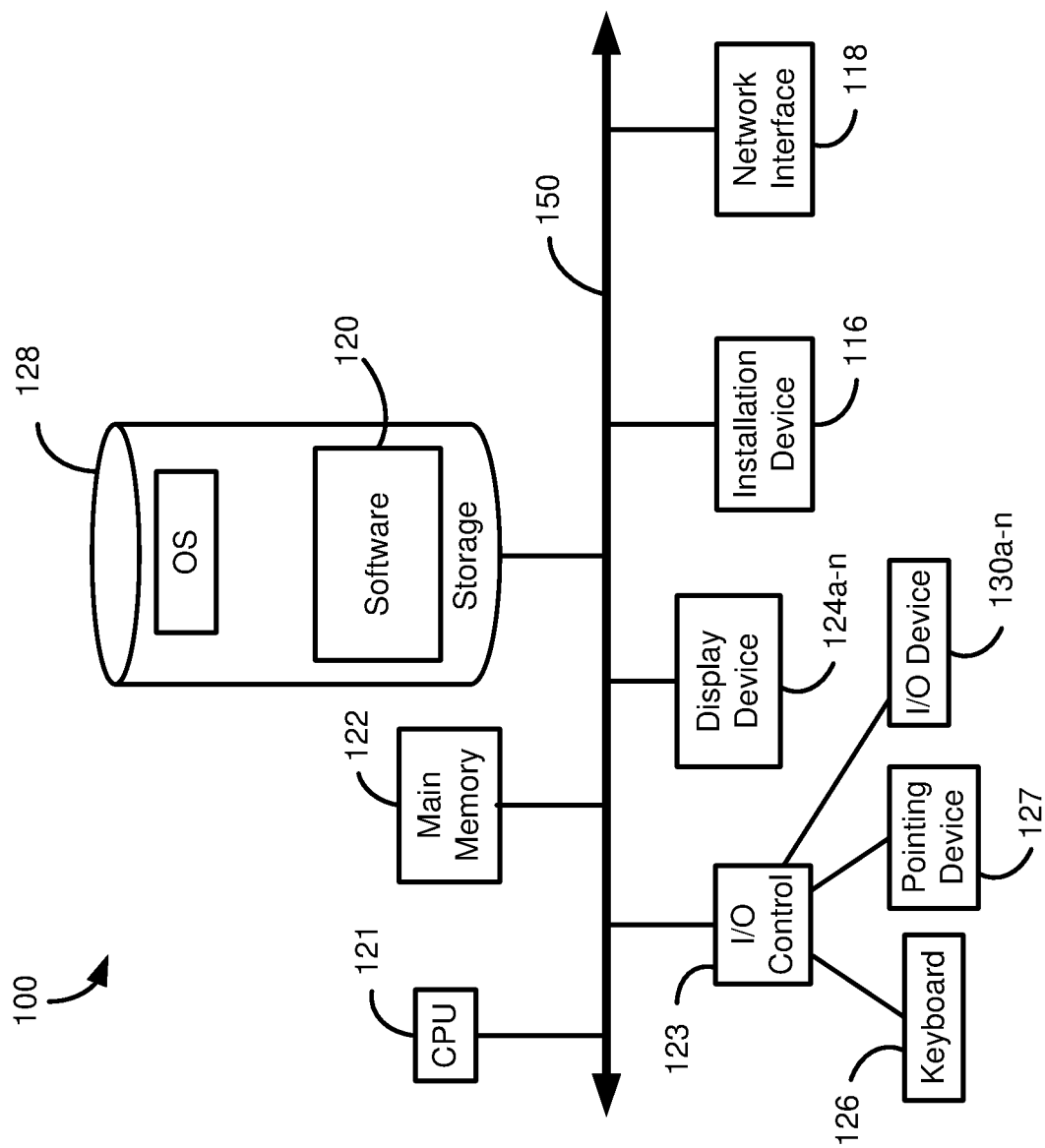
FIGS. 1B and 1C are block diagrams depicting computing devices useful in connection with the methods and systems described herein, according to some embodiments.
Figure 1C:
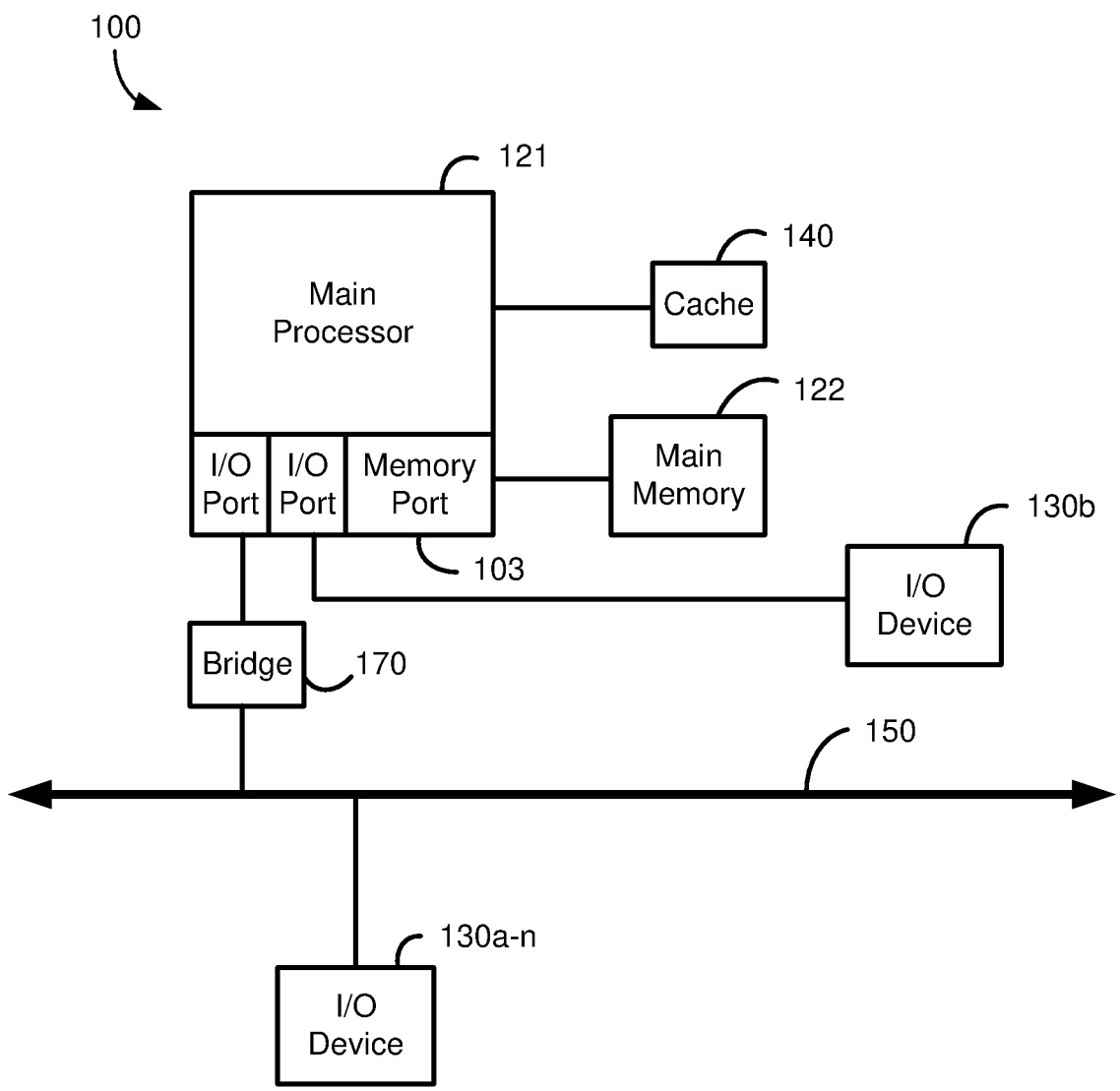

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or AP 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126, and a pointing device 127 such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Frame Formats for Sounding and Steering in MIMO Communication

Disclosed herein are related to a system and a method for providing a joint transmission by a group (or plurality) of distributed access points. In one aspect, disclosed herein are related to frame formats for sounding and steering of the joint transmission.

Described herein are systems and methods for establishing a MIMO connection among two or more access points and at least a station device (sometimes referred to as a station or STA). In some embodiments, the access points include a master access point and two or more slave access points capable of transmitting data through a wireless medium. In some embodiments, the master access point configures or coordinates with different slave access points for a joint transmission. In one aspect, a station device may not be able to successfully receive and decode transmission by a single master access point or a single slave access point. However, the station device may successfully receive and decode a joint transmission by two or more access points.

In some embodiments, the master access point configures different station devices for a joint transmission in two phases: a sounding and a steering. During the sounding, channel estimation is performed to determine signal strengths, relative signal phases, and/or qualities of transmissions from different access points received by station devices, and/or to determine a configuration of a joint transmission according to the determined signal strengths, relative signal phases, or qualities of transmissions from different access points. Examples of the configuration of the joint transmission can include timing, power, gain, channel bandwidth, frequency for transmission through one or more antennas, steering vector, or any information indicating how to radiate energy in a particular direction, frequency-dependency within a channel, signal-to-noise ratio (SNR), and/or appropriate data rate adjustments. During the steering phase, the access points and the station devices can communicate through a beamforming according to the configuration determined during the sounding, such that the station devices can receive and decode joint transmissions from the access points.

Disclosed herein are related to frame formats for sounding and/or steering. In one aspect, the frame formats disclosed herein can enable slave access points to estimate or determine synchronization information for joint transmission with a master access point. Examples of the synchronization information can include a carrier frequency offset, a sampling frequency offset, a first reference value for a common phase offset, and/or a second reference value for a timing offset with respect to the master access point. For example, the master access point transmits a slave trigger frame or a preamble of a null data packet that enables slave access points to estimate or determine synchronization information. According to the synchronization information, the master access point and the slave access points may transmit together simultaneously for sounding, steering or both.

Described herein are systems and methods for performing channel estimation between a beamformer and a beamformee (e.g., at least one AP 106 and at least one device 102) for example in a multi-user multiple-input and multiple-output (MU-MIMO) environment. The AP 106 (hereinafter sometimes generally referred to as an "access point" or "AP"), for example in a MU-MIMO configuration, can include an AP 106 that can communicate with each of a plurality of devices 102 (e.g., beamformees). The AP 106 can include a number of antennas and can support a number of spatial streams for transmission to a device (sometimes referred to as a station (STA) or user) 102. An AP 106 can leverage and use one or more sounding frames, such as null data packet (NDP) or NDP announcement (NDPA) frames or other control frames, to request the device 102 for channel estimation feedback.

The dimension of the AP 106 (embodied as a beamformer) sometimes refers to the number of spatial streams or the number of available transmit antennas the AP 106 supports. The dimension of the wireless communication device 102 (embodied as a beamformee) sometimes refers to the number of spatial streams the device 102 can support, e.g., for channel estimation. In some aspects, the present methods and systems can allow a higher dimension AP 106 or a coordinated set of APs 106 (both hereafter sometimes generally referred to as a single "beamformer", wherein the coordinated set of APs 106 can be configured to operate in some ways like a single beamformer), to use the beamformer's transmission antennas to steer and achieve full array gain even if paired against a device 102 of lower dimension. The device 102 can be capable of supporting less than the number of spatial streams that the AP 106 can include in a sounding, for performing multi-input multi-output (MIMO) channel estimation. The present solution can provide for multiple soundings using subsets of the beamformer's antennas, in place of a single sounding using all of the beamformer's antennas (which the beamformee does not support). A coordinated sequence of soundings from subsets of antennas can elicit different sets of MIMO channel estimation results from a low dimensional beamformee, which can be combined to produce full channel estimation information. For example, in certain embodiments, by defining the subsets to have overlapping antennas, the channel estimation feedback matrices for the different subsets/soundings can be merged or combined to yield channel estimation for the full channel of the AP 106.

In some embodiments, multiple beamformers (e.g., APs 106) can operate in a coordinated fashion as if a higher dimensional beamformer is communicating with one or more beamformee(s). Multiple sounding reports from the same device 102 to the different APs 106 can be combined and/or shared between the coordinated APs 106, to understand the MU-MIMO channels between each beamformer-beamformee pair. In another embodiment, the coordinated APs 106 can be time and/or frequency synchronized (e.g., using frequency diversity or offset) to provide a sounding sequence that can appear like a single sounding sequence from a higher dimension beamformer.

In some embodiments, the AP 106, e.g., embodied as a beamformer, can receive responses from the device 102, e.g., embodied as a beamformee, to the plurality of sounding frames. The responses can include channel estimation for the plurality of subsets of transmit spatial streams. The AP 106 can generate full channel estimation information based on the received responses. The full channel estimation information can include channel estimation information corresponding to all the transmit spatial streams that the AP 106 can provide. The AP 106 can steer the plurality of transmit antennas of the AP 106 based on the full channel estimation information.

In yet another aspect, this disclosure is directed to a method for performing channel estimation between a plurality of APs 106 embodied as beamformers and at least one device 102 embodied as a beamformee. The method can include configuring a first AP 106 and a second AP 106 to communicate with a first device 102. The first AP 106 can support a first plurality of transmit spatial streams. The second AP 106 can support a second plurality of transmit spatial streams. The first AP 106 and the second AP 106 can determine, between the first AP 106 and the second AP 106, a plurality of subsets of transmit spatial streams from the first plurality of transmit spatial streams and the second plurality of transmit spatial streams. The first AP 106 and the second AP 106 can coordinate, between the first and the second beamformers 106, transmission of a plurality of sounding frames to the first device 102 for channel estimation based at least on the determined plurality of subsets of transmit spatial streams.

In some embodiments, the first AP 106 and the second AP 106 are configured to communicate with the first device 102. The first AP 106 and the second AP 106 can be operably coupled via a backbone connection. The first AP 106 and/or the second AP 106 can combine at least some responses from the first device 102 to the plurality of sounding frames, the responses including channel estimation for the plurality of subsets of transmit spatial streams. The first AP 106 and/or the second AP 106 can generate full channel estimation information between the first AP 106 and the second AP 106, based on the combination of the at least some responses. The first AP 106 and the second AP 106 can be configured to communicate with a plurality of beamformees 102. The first AP 106 and the second AP 106 can coordinate, between the first AP 106 and the second AP 106, transmission of a plurality of sounding frames to a plurality of the devices 102. The first AP 106 and/or a second AP 106 can use frequency diversity to simultaneously send a sounding frame from the first AP 106 and a sounding frame from the second AP 106.

Figure 2A:
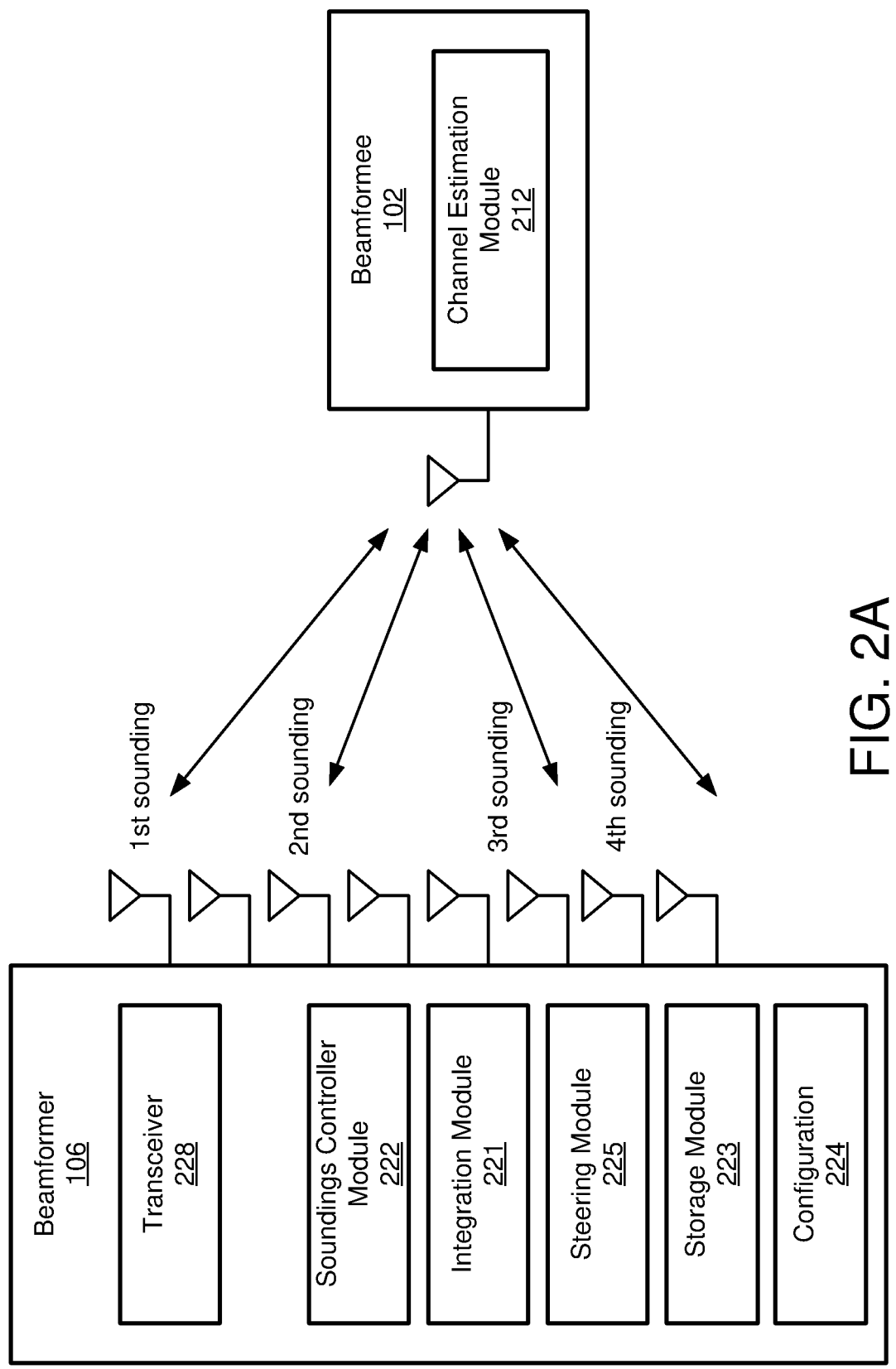
FIG. 2A is a block diagram depicting a system for performing channel estimation between a beamformer and a beamformee, according to some embodiments.

Referring to FIG. 2A, an embodiment of a system for establishing a MIMO communication between at least one AP 106 and at least one device 102 is depicted. In brief overview, one embodiment of the system can include the AP 106 in communication with the device 102. The AP 106 can include a wireless transceiver 228, a soundings controller module (SCM) 222 (also referred to as "a soundings controller 222"), a steering controller module 225 (also referred to as "a steering controller 225"), an integration module 221 (also referred to as "an integration controller 221"), a storage module 223 and/or a configuration 224. The device 102 can include a wireless transceiver and a channel estimation module (CEM) 212 (also referred to as "a channel estimation controller 212"). The AP 106 can include a plurality of antennas (e.g., phase array antennas).

In some embodiments, the system can support at least some aspects of a MU-MIMO transmission configuration 224 between the AP 106 embodied as a beamformer and the device 102 embodied as a beamformee. For example, the AP 106 can be of higher dimensionality relative to the device 102. The device 102 can perform channel estimation for a number of spatial communication streams up to the dimensionality of the device 102. Device 102 can provide channel estimation for more dimensions than it has antennas in one embodiment. For example, device 102 can have only one antenna but can have the capability to estimate a three antenna channel. By way of illustration, the AP 106 can be of higher dimensionality and/or capability than some of the devices 102 (e.g., older generation beamformees) in deployment. In one embodiment, the device 102 can for example be capable of performing channel estimation for up to a pre-configured number of transmit spatial streams from the AP 106, the pre-configured number of transmit spatial streams being less than a number of transmit spatial streams that the AP 106 can provide.

The AP 106 can be implemented (e.g., configured and/or built) to support, simultaneously or otherwise, a first number of transmit streams, channels or connections, for instance within a transmission or sounding frame. The AP 106 can include a coordinated set of APs 106. The sounding frame can include an MU-MIMO frame, SU-MLMO frame and/or an NDP frame. The AP 106 can be implemented to include a first number of transmit chains and/or transmit antennas. The device 102 can be implemented to support (simultaneously or otherwise) a second number of spatial streams, channels or connections (hereafter sometimes generally referred to as "spatial streams" or "Nss"). The second number of spatial streams can be lower than the first number of streams.

In some embodiments, a total or predetermined number of spatial streams that a device 102 can support can be stored or indicated in the beamformee's capability field—"Compressed Steering Number of Beamformer Antennas Supported." This field can be defined or included in a management frame. This field can include or indicate a Nss that the AP 106 can handle or support in an NDP frame, for example. This field can set the range of transmit spatial dimensions for which the device 102 can perform channel estimation, generate a proper beamforming report, and/or create a sounding feedback frame (sometimes generally referred to as a "response") to the AP 106. In some embodiments, this capability is fixed once the device 102 or AP 106 is implemented and/or deployed in the field, and in some embodiments not upgradable (e.g., through a software patch).

In some embodiments, the pre-configured or ceiling Nss of the device 102 can limit transmit beamforming performance, e.g., of the AP 106 and/or the device 102. For example, when the device's channel estimation capability fails to support the full extent of the AP's transmit antennas, the AP 106 might not be able to use all of its transmit antennas for steering, and might not be able to achieve full array gain. In some embodiments, for multi-user transmit beamforming, the AP 106 might have to use the minimal sounding capability among the devices 102 with different sounding capabilities. The AP 106 might have to turn on fewer than the full set of antennas, corresponding to the minimal sounding capability. Existing transmit-beamforming (TXBF) capable devices with limited sounding capabilities can remain available in the market and/or remain deployable in the field for some time, before these devices are eventually replaced by higher capability devices. The present methods and systems, in some aspects, provide support for such devices 102.

In some embodiments, the AP 106 includes a transceiver 228 allowing the beamformer 106 to communicate with other devices (e.g., beamformee 102 or another beamformer 106) through one or more antennas. For example, the transceiver 228 includes a transmitter that encodes data (e.g., content data, control data, response data, announcement, etc.) at a baseband frequency, upconverts the encoded data to a radio frequency, and transmits the upconverted signal through one or more antennas. For another example, the transceiver 228 includes a receiver that downconverts a wireless signal at a radio frequency received through one or more antennas to a baseband frequency, and decodes the converted signal to obtain data (e.g., content data, control data, response data, announcement, etc.). In some embodiments, the AP 106 transmits and receives data at the same frequency, separate frequencies, or at overlapping frequencies.

In some embodiments, the AP 106 includes a SCM 222. The SCM 222 can manage and/or control transmission of a plurality of sounding frames (e.g., NDP sounding frames) to a low-capability device 102. The SCM 222 can include hardware, or a combination of hardware and software. For example, the SCM 222 can include any application, program, library, script, task, service, process or any type and form of executable instructions executing on hardware of the AP 106. In one embodiment, the SCM 222 includes a set of executable instructions executing on a core or processor of the AP 106. The SCM 222 can include circuitry designed and/or constructed to perform any of the operations and functions described herein. In some embodiments, the SCM 222 is configured to control transmission of sounding frames to the device 102 via one or more antennas of the AP 106. For example, the SCM 222 can be configured to allocate, select or assign certain antennas to participate in one or more soundings within a set of soundings. The SCM 222 can for example tune a subset of the beamformer's antennas (e.g., phase array antennas) to participate in a particular sounding. In some embodiments, the SCM 222 of a master AP determines, instructs, or schedules, a sounding sequence, as disclosed herein. In some embodiments, the SCMs 222 of different APs coordinate with each other to determine or schedule the sounding sequence disclosed herein.

In some embodiments, the SCM 222 includes firmware executing on the AP 106 hardware. The firmware can operate in a layer of a protocol stack of the AP 106 (e.g., in an upper layer). In certain embodiments, the SCM 222 operates in the MAC layer, e.g., residing between a lower layer of MAC and a higher layer of MAC. The AP 106 or SCM 222 can partition, allocate or otherwise assign the plurality of antennas into a plurality of subsets of antennas, e.g., based on a configuration 224. In some embodiments, an antenna can be assigned to more than one of the subsets. Each subset of antennas can be selected according to a configuration 224, which can be consistent with one or more predefined rules, policies, requirements and/or guidelines. For example, each subset of antennas can include antennas physically adjacent to each other on the AP 106, and/or selected according to a certain order or sequence. In some embodiments, each subset of antennas can include antennas that are separated from each other by at least another antenna not in the subset, e.g., to include some spatial degree of freedom or separation. In some embodiments, the SCM 222 configures each subset to include at least one antenna common to at least one other subset.

The SCM 222 can manage or control the transmission of a plurality of sounding frames corresponding to the subsets of antennas. Each sounding can cover a subset of the AP's antennas. The SCM 222 or AP 106 can instruct, cause, or allow the coordinated transmission in sounding frames through different antennas in a particular order. The SCM 222 or AP 106 can cause the transceiver 228 to transmit the soundings frames distributed or staggered over a period of time, e.g., at predefined intervals. The SCM 222 or AP 106 can provide sufficient time for the AP 106 to process each sounding frame and/or provide a response to each sounding frame, before sending a next sounding frame. The SCM 222 can store information about the configured subsets, and/or information about a sequence of corresponding soundings, to the configuration 224 and/or storage module 223.

The configuration 224 can include, maintain or store information about assignment or allocation of antennas to subsets for sounding purposes, and/or information about a sequence of soundings corresponding to the configured subsets. The configuration 224 can include information about connecting or coupling a specific antenna to a particular transmit chain. The configuration 224 can include a schedule or timing information for performing soundings. The configuration 224 can be stored in a storage module 223. The storage module 223 can include one or more interconnected storage devices, such as any embodiment of storage devices 128, 140, 122, described above in connection with FIGS. 1B and 1C. In some embodiments, the SCM 222 and/or the integration module can generate, access and/or update the configuration.

The configuration 224 can include a list, table or other database structure, and can include at least one entry, record or specification corresponding to each device 102 for example. The configuration 224 can be specified and/or defined in a file or a collection of records, stored or maintained in the storage module 223. A SCM 222 and/or integration module 221 can access a portion of the configuration, to implement partial channel estimation through multiple soundings. For example, an integration module can use a hash to perform lookup in the configuration 224 for an antenna or device, to process channel estimation feedback.

In some embodiments, the device 102 includes a CEM 212. The CEM 212 can process a sounding frame received by the device 102. For example, the CEM 212 can perform channel estimation and/or provide channel estimation feedback. Channel estimation can include any form of channel measurement and/or calibration, or channel response determination. Channel estimation results can be used to provide feedback to the AP 106 on how to radiate energy in a particular direction, frequency-dependency within a channel, signal-to-noise ratio (SNR), and/or appropriate data rate adjustments, for example. The CEM 212 can include hardware, or a combination of hardware and software. For example, the CEM 212 can include any application, program, library, script, task, service, process or any type and form of executable instructions executing on hardware of the CEM 212. In one embodiment, the CEM 212 includes a set of executable instructions executing on a core or processor of the CEM 212.

The CEM 212 can include circuitry designed and/or constructed to perform any of the operations and functions described herein. In some embodiments, the CEM 212 is pre-configured to perform channel estimation in a particular environment, e.g., a SU-MIMO or MU-MIMO environment. In some embodiments, the CEM 212 includes firmware executing on the hardware of the device 102. The firmware can operate in a layer of a protocol stack of the device 102 (e.g., in an upper layer). The CEM 212 can operate in the MAC layer, e.g., residing between a lower layer of MAC and a higher layer of MAC. The CEM 212 can provide the channel estimation feedback for inclusion in a response to a sounding frame from the AP 106. The CEM 212 can manage or direct the transmission of one or more responses to the AP 106.

In some embodiments, the AP 106 can include an integration module 221. The integration module 221 can manage, track and/or process the responses received from the device 102. The integration module 221 can store information (e.g., channel estimation information) from one or more responses in a storage module 223. The integration module 221 can order and/or combine channel estimation information from the response, for example, based at least in part on information stored in the configuration 224 (e.g., information about the configured subsets, and/or the sequence of soundings corresponding to the configured subsets). According to the channel estimation information, the integration module 221 may determine steering information. In one aspect, the steering information indicates configuration of the transceiver 228 of the AP 106 and/or other APs 106 for steering. For example, the steering information indicates timing, power, gain, channel bandwidth, frequency for transmission through one or more antennas, steering vector, or indicates how to radiate energy in a particular direction, frequency-dependency within a channel, signal-to-noise ratio (SNR), and/or appropriate data rate adjustments for joint transmission with other access points.

The integration module 221 can include hardware, or a combination of hardware and software. For example, the integration module 221 can include any application, program, library, script, task, service, process or any type and form of executable instructions executing on hardware of the AP 106. In one embodiment, the integration module 221 includes a set of executable instructions executing on a core or processor of the AP 106. The integration module 221 can include circuitry designed and/or constructed to perform any of the operations and functions described herein. In some embodiments, the integration module 221 includes firmware executing on the hardware of the AP 106. The firmware can operate in a layer of a protocol stack of the AP 106 (e.g., in an upper layer). In certain embodiments, the integration module 221 operates in the MAC layer, e.g., residing between a lower layer of MAC and a higher layer of MAC. In some embodiments, the integration module 221 is configured to combine, integrate, merge, normalize, adjust and/or aggregate information from the responses to obtain full channel information. In some embodiments, the integration module 221 is integrated with the soundings controller 222 or is implemented as part of the soundings controller 222.

In some embodiments, the AP 106 includes a steering module 225. The steering module 225 can manage and/or control transmission of steered frames to a low-capability device 102. The steering module 225 can include hardware, or a combination of hardware and software. For example, the steering module 225 can include any application, program, library, script, task, service, process or any type and form of executable instructions executing on hardware of the AP 106. In one embodiment, the steering module 225 includes a set of executable instructions executing on a core or processor of the AP 106. The steering module 225 can include circuitry designed and/or constructed to perform any of the operations and functions described herein. In some embodiments, the steering module 225 is configured to control transmission of steered frames to the device 102 via one or more antennas of the AP 106. For example, the steering module 225 can be configured to allocate, select or assign certain antennas to participate in one or more steerings. The steering module 225 can for example tune a subset of the beamformer's antennas (e.g., phase array antennas) to participate in a particular steering.

In some embodiments, the steering module 225 includes firmware executing on the AP 106 hardware. The firmware can operate in a layer of a protocol stack of the AP 106 (e.g., in an upper layer). In certain embodiments, the steering module 225 operates in the MAC layer, e.g., residing between a lower layer of MAC and a higher layer of MAC. The AP 106 or steering module 225 can partition, allocate or otherwise assign the plurality of antennas into a plurality of subsets of antennas, e.g., based on a configuration 224 or the integration module 221. In some embodiments, an antenna can be assigned to more than one of the subsets. Each subset of antennas can be selected according to a configuration 224 and/or by the integration module 221, which can be consistent with one or more predefined rules, policies, requirements and/or guidelines. For example, each subset of antennas can include antennas physically adjacent to each other on the AP 106, and/or selected according to a certain order or sequence. In some embodiments, each subset of antennas can include antennas that are separated from each other by at least another antenna not in the subset, e.g., to include some spatial degree of freedom or separation. In some embodiments, the steering module 225 configures each subset to include at least one antenna common to at least one other subset.

The steering module 225 can manage or control transmission of data (e.g., content data) corresponding to the subsets of antennas. The steering module 225 can cause the coordinated transmission or joint transmission of content data in steered frames through different antennas or with another AP 106 in a particular order. The steering module 225 may transmit according to the steering information (e.g., steering vector). The steering module 225 can cause the transceiver 228 to transmit the steered frames distributed or staggered over a period of time, e.g., at predefined intervals. The steering module 225 can provide sufficient time for another AP 106 or a device 102 to process each steering and/or provide a response to each steering, before sending a next steered frame.

In some embodiments, the present methods can be implemented or applied transparent to a low capability device 102. For example, the device 102 might not even realize or be aware that the multiple access points 106 are coordinated and transmit sounding frames or steered frames simultaneously.

Figure 2B:
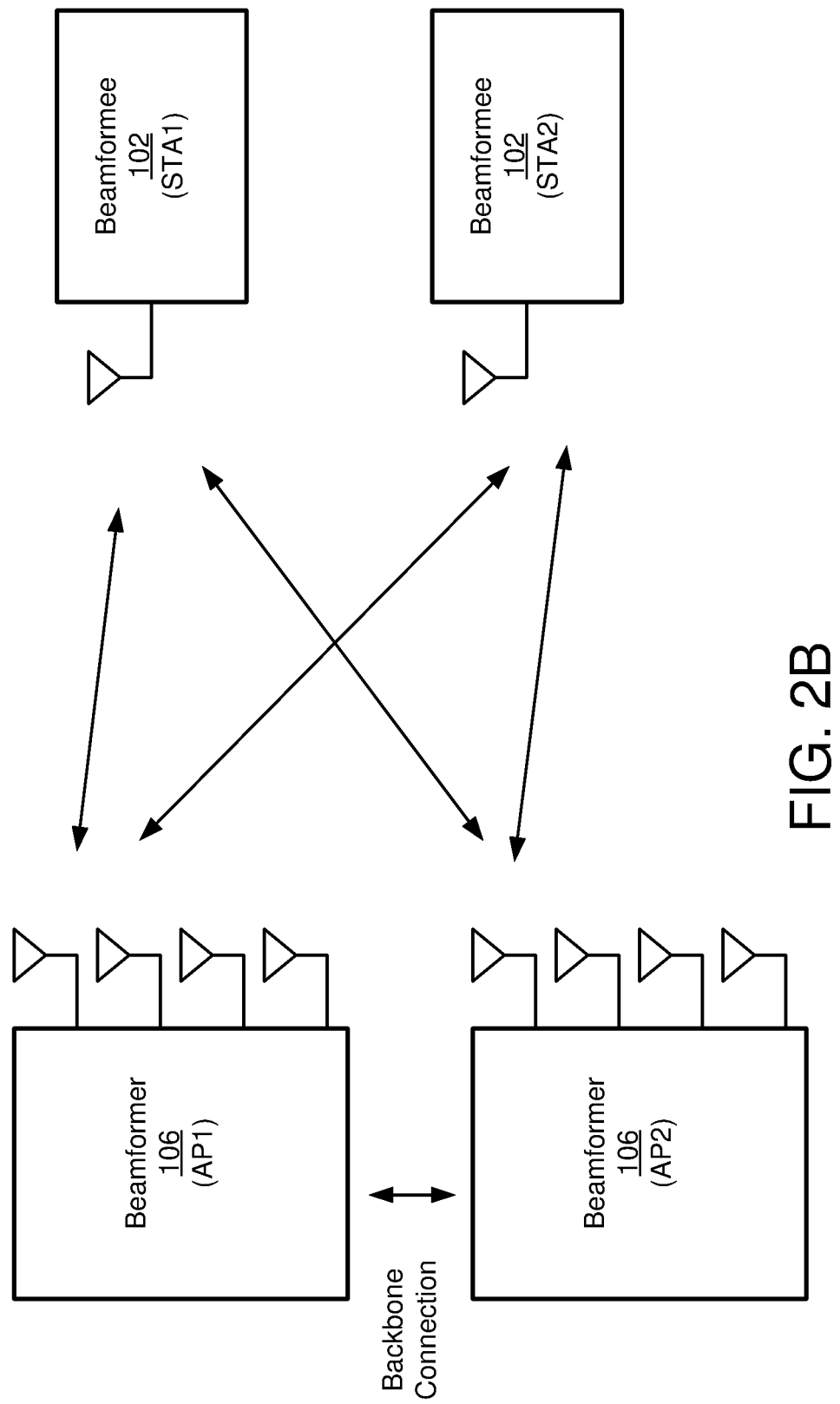
FIG. 2B is a block diagram depicting a system for performing channel estimation between at least one beamformer and at least one beamformee, according to some embodiments.

In some embodiments, a high dimensional transmit structure (e.g., a single AP 106) can be formed by combining and/or coordinating two or more lower dimensionality beamformers 106. Referring to FIG. 2B, an embodiment of a system for performing sounding and steering between at least one AP 106 and at least one device 102 is depicted. In brief overview, the system can include at least two APs operably coupled together to effectively operate as a single AP 106 (hereafter sometimes referred to as "coordinated beamformers" or as a single "beamformer"). The coordinated beamformers can be in communication with one or more devices 102 embodied as beamformees. The coordinated beamformers can include a transceiver 228, a SCM 222, an integration module 221, a steering module 225, a storage module 223 and/or a configuration 224, each of which can include one or more features described above in connection with FIG. 2A. Each of these modules can reside on at least one of the coordinated beamformers (APs 106), distributed among different APs 106, or can reside at one or more networked locations.

In some embodiments, increasing or combining the number of antennas at the AP 106 can provide better or improved array gain and diversity. By way of illustration, for single-user transmit beamforming, an array gain can be represented by $10*\log 10(NTX/Nss)$ dB, and a corresponding diversity order can be represented as $NTX*NRX$, where NTX can represent the number of transmit antennas, and NRX can represent the number of receive antennas. A large number of transmit antennas at the beamformer side can provide more spatial degrees of freedom, e.g., allowing for improved link quality. In some embodiments, total capacity of the system can increase linearly with respect to the number of beamformer antennas (e.g., in an asymptotic sense). A larger number of transmit antennas can support or host more beamformees (e.g., multi-user STAs), for instance using a multi-user steered frame to achieve better spectrum efficiency. In certain embodiments, a larger number of transmit antennas can allow for better multi-user precoding matrices for a given set of beamformees (e.g., multi-user STAs). A significant portion of existing access points 106 can be implemented with a limited number of transmit antennas, e.g., up to three antennas. In accordance with certain aspects of the disclosure, transmit antennas from a few low dimensional beamformers 106 can be combined or aggregated to achieve better performance.

In some embodiments, multiple lower dimensional APs 106 are connected to each other, for example through an Ethernet backbone or other connection (e.g., a wireless connection such as Wi-Fi, cellular, Bluetooth, etc.). These APs 106 can be coordinated to generate multiple sounding sequences between the APs 106 and the devices 102, to determine the channels (e.g., MU-MIMO channels) between each beamformer-beamformee pair. Sounding feedback reports from different devices 102 can be shared and/or processed between the coordinated beamformers (e.g., APs 106), for example, using the techniques described in connection with at least FIGS. 2A and 2B. For example, multiple sounding feedback reports from the same device 102 to multiple APs 106 can be combined in such a way as if the APs 106 include a single higher dimensional AP 106 communicating to the device 102. Multi-user precoding can be performed, for example, using post-combined MU-MIMO channels. When performing multi-user steering, the coordinated beamformers 106 might have to coordinate the steered frame transmission so that the steered frame as formed appears to come from a larger dimensional AP 106 rather than several different lower dimensional APs 106. The coordinated APs 106 can be time synchronized. For example, the APs 106 can coordinate steered frame transmission through a backbone Ethernet or other connection (e.g., a wireless connection such as Wi-Fi, cellular, Bluetooth, etc.).

In certain embodiments, the system can time and/or frequency synchronize the coordinated APs 106, for example by adjusting frame timing and/or carrier frequency offset (CFO). The coordinated APs 106 can transmit sounding frames, steered frames, or a combination of them in a coordinated manner as if the frames are sent from a single larger dimensional AP 106. The precoding matrix and/or steered frame can be formed in a coordinated manner. When performing multi-user steering, the coordinated APs 106 might have to coordinate the steered frame transmission so that the steered frame as formed appears to come from a larger dimensional AP 106 rather than several different lower dimensional APs 106. In performing frequency synchronization, the coordinated APs 106 can synchronize their carrier frequency offset or CFO. This can be performed by observing uplink transmission from different devices 102, sharing the CFO among the APs 106. In some embodiments, the coordinated APs 106 can be time synchronized. For example, one of the APs 106 can begin frame transmission first (e.g., L-STF and L-LTF signals transmitted first). The rest of the coordinated APs 106 can join in the transmission starting from the VHT-STF signal, for example by monitoring for presence and/or timing of the L-STF and L-LTF signal on the air.

Figure 3A:
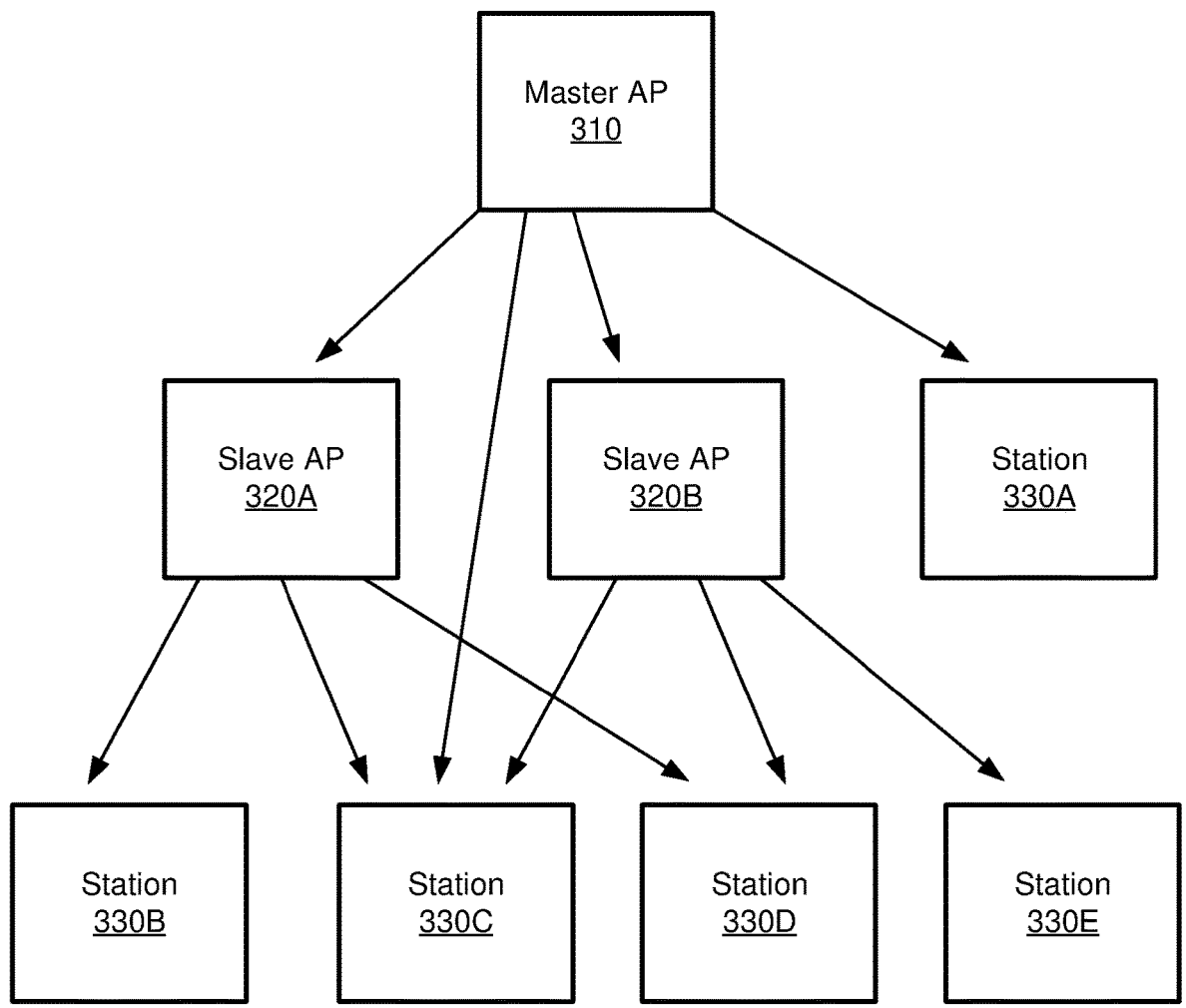
FIG. 3A is a block diagram illustrating an example network environment including a master access point and multiple station devices for a joint transmission, according to some embodiments.

FIG. 3A is a block diagram illustrating an example network environment 300 including a master AP 310 and multiple slave APs 320A, 320B for a joint transmission to stations devices 330A-330E, according to some embodiments. In some embodiments, each of the master AP 310 and the slave APs 320A, 320B, or the combination of the master AP 310 and the slave APs 320A, 320B is implemented or operate as the beamformer 106 of FIGS. 2A and 2B. In some embodiments, the network environment 300 includes more, fewer or different components than shown in FIG. 3A.

In some embodiments, the master AP 310 is capable of directly communicating with the slave APs 320A, 320B, and the station devices 330A, 330C through a wireless medium, but may be incapable of directly communicating with the station devices 330B, 330D, 330E alone. For example, the station devices 330A, 330C can successfully receive and decode a wireless transmission by the master AP 310 alone, but the station devices 330B, 330D, 330E may not successfully receive and decode the wireless transmission by the master AP 310 alone. In some embodiments, the slave AP 320A is capable of directly communicating with the master AP 310 and the station devices 330B, 330C, 330D. In some embodiments, the slave AP 320B is capable of directly communicating with the master AP 310 and the station devices 330C, 330D, 330E.

In some embodiments, the master AP 310 configures, causes, or instructs the slave APs 320A, 320B for a joint transmission. In one aspect, the station devices 330A-330E can successfully receive and decode the joint transmission by the master AP 310 and the slave APs 320A, 320B. In some embodiments, the master AP 310 and the slave APs 320A, 320B communicate with each other through a wireless medium in a particular frame format to enable a joint transmission. In one aspect, a frame format disclosed herein enables the slave APs 320A, 320B to estimate or determine synchronization information for a joint transmission with the master AP 310. Examples of the synchronization information include a carrier frequency offset (CFO), a sampling frequency offset (SFO), a phase offset (PO), a timing offset (TO), a first reference value for a common phase offset, and/or a second reference value for a timing offset with respect to the master AP 310. For example, the master AP 310 transmits, to the slave APs 320A, 320B, a slave trigger frame or a preamble of a null data packet including information that enables the slave APs 320A, 320B to estimate or determine synchronization information. In some embodiments, the synchronization information is determined according to a difference of measurements obtained in the sounding sequence and the steering sequence. In one approach, the slave AP uses the channel estimations, denoted here by the vectors h_ndp (for the channel before the NDP) and h_data (for the channel before the joint data transmission) to calculate two parameters related to the phase drift: timing errors (or acquisition error) and a common phase drift. In some embodiments, the timing errors are manifested as a linear phase drift across frequency, where the common phase drift is due to different RF clocks and phase noise between the maser AP 310 and the slave AP 320. Assuming that for tone i, $$h\_data(i) = h\_ndp(i)e^{j(\emptyset i+\theta)} + N_i \qquad \text{Eq. (1)}$$

where $N_i$ is a noise component for the tone i, $\emptyset$ corresponds to the timing error, $\theta$ corresponds to the common phase drift. If h_data(i) and h_ndp(i) are known, a phase difference h_diff(i) between h_data and h_ndp(i) can be found as:

$$h\_diff(i) = h\_data * \frac{conj(h\_ndp)}{|h\_ndp|} = |h\_ndp(i)|e^{j(\emptyset i+\theta)} + N'_i \qquad \text{Eq. (2)}$$

where $N'_i$ is a modified noise component for the tone i. Note that the channel phase comes out, and a real positive number multiplied by a phasor is obtained. In one aspect, this represents that the channel impact manifests itself through amplitude variations over frequency. With MIMO configuration this metric is summed up across the receive antennas, in some embodiments. In one aspect, to determine the timing error, the following equation can be used.

$$\text{angle} \sum_i h\_diff(i+K)h\_diff(i)^* =  \qquad \text{Eq. (3)}$$
$$\text{angle} \sum_i |h\_ndp(i+K)||h\_ndp(i)|e^{j(\emptyset K)} + \tilde{N}_i$$

where $\tilde{N}_i$ is a noise component for the tone i. Because the channel phase is not present in the timing metric shown in Eq. (3), increasing K is allowed, as this is the only contributor to the angle, in some embodiments. In one aspect, to determine the common phase drift, following equation can be used:

$$\text{angle}(\Sigma_i(h\_diff(i)*h\_diff(-i)))/2 \qquad \text{Eq. (4)}.$$

According to the timing error obtained through Eq. (3) and the common phase drift obtained through Eq. (4), synchronization information can be determined. Moreover, according to the synchronization information, the master AP 310 and the slave APs 320A, 320B may perform a joint transmission.

Figure 3B:
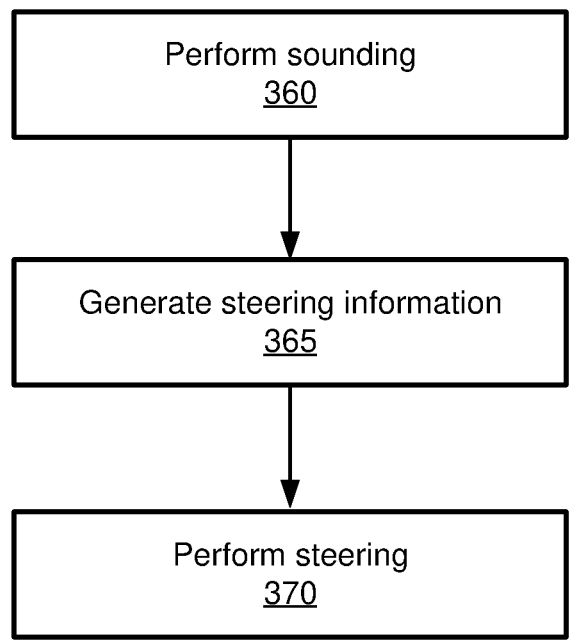
FIG. 3B is a flow chart illustrating an example process of establishing an example multiple-input multiple-output (MIMO) communication, according to some embodiments.

FIG. 3B is a flow chart illustrating an example process 350 of establishing an example multiple-input multiple-output (MIMO) communication, according to some embodiments. In some embodiments, the process 350 is performed by the master AP 310, or by the master AP 310 and the slave APs 320A, 320B. In other embodiments, the process 350 is performed by other entities. In other embodiments, the process 350 includes more, fewer, or different steps than shown in FIG. 3B.

In one approach, the master AP 310 and the slave APs 320A, 320B perform 360 sounding. For example, a soundings controller 222 of the master AP 310 may initiate a sounding to obtain or gather channel estimation information. The soundings controller 222 of the master AP 310 may cause the transceiver 228 of the master AP 310 to transmit through a wireless medium, to the slave APs 320A, 320B, a frame or a portion of the frame that allows the slave APs 320A, 320B to obtain synchronization information for a joint transmission to perform sounding. For example and in some embodiments, the soundings controller 222 of the master AP 310 causes the transceiver 228 of the master AP 310 to transmit a slave trigger frame or a preamble of a null data packet frame that allows soundings controllers 222 of the slave APs 320A, 320B to determine or estimate a carrier frequency offset, a sampling frequency offset, a phase offset, a timing offset, a first reference value for a common phase offset, and/or a second reference value for a timing offset with respect to the master AP 310. In one aspect, it may be difficult to ascertain the absolute phase offset and timing offset of a slave AP with respect to the master AP. In some embodiments, the slave APs 320A, 320B can estimate the change in phase/timing offset between sounding and steering (via the preceding trigger frames), according to Eq. (1)-(4) above. The soundings controller 222 of the master AP 310 causes the transceiver 228 of the master AP 310 to transmit a portion of a frame (e.g., NDP frame) to the station devices 330A-330E to cause the station devices 330A-330E to perform channel estimations. The soundings controllers 222 of the slave APs 320A, 320B may cause transceivers 228 of the slave APs 320A, 320B to transmit the portion of the frame to the station devices 330A-330E according to the synchronization information, while the master AP 310 transmits the portion of the frame (e.g., NDP frame). The joint transmission by the master AP 310 and the slave APs 320A, 320B allows the station devices 330A-330E to successfully receive and decode the portion of the frame. In one approach, the station devices 330A-330E may measure or determine signal strengths and/or signal qualities of the joint transmission for sounding, and generate channel estimation information indicating the measured signal strengths or signal qualities. Detailed descriptions on example frame formats and operations of sounding are provided below with respect to FIGS. 5-9.

In one approach, the master AP 310 generates 365 steering information in response to the channel estimation information. In some embodiments, the integration module 221 of the master AP 310 receives and integrates channel estimation information from different station devices 330A-330B, and determines or generates steering information to perform steering according to the integrated channel estimation information. In one aspect, the steering information indicates, for each AP, configuration of the transceiver 228 for steering. For example, the steering information indicates timing, power, gain, channel bandwidth, frequency for transmission through one or more antennas, steering vector, or indicates how to radiate energy in a particular direction, frequency-dependency within a channel, signal-to-noise ratio (SNR), and/or appropriate data rate adjustments for joint transmission with other access points. The integration module 221 of the master AP 310 generates the steering information according to the channel estimation information, that allows joint transmission by the access points 310, 320A, 320B. In one aspect, the master AP 310 generates the steering information and shares the steering information with the slave APs 320A, 320B. In some embodiments, each slave AP 320 generates the steering information for itself, provided that the same channel information is available at all APs.

In one approach, the master AP 310 performs 370 steering according to the steering information. For example, a steering controller 225 of the master AP 310 may initiate a steering. The steering controller 225 of the master AP 310 may cause the transceiver 228 of the master AP 310 to transmit, to the slave APs 320A, 320B, a frame that allows the slave APs 320A, 320B to obtain synchronization information for a joint transmission to perform steering. For example, the steering controller 225 of the master AP 310 causes the transceiver 228 of the master AP 310 to transmit a slave trigger frame or a preamble of a steered frame that allows steering controllers 225 of the slave APs 320A, 320B to determine or estimate a carrier frequency offset, a sampling frequency offset, a phase offset, a timing offset, a first reference value for a common phase offset, and/or a second reference value for a timing offset with respect to the master AP 310. In one aspect, it may be difficult to ascertain the absolute phase offset and timing offset of a slave AP with respect to the master AP. In some embodiments, the slave APs 320A, 320B can estimate the change in phase/timing offset between sounding and steering (via the preceding trigger frames), according to Eq. (1)-(4) above. The steering controller 225 of the master AP 310 causes the transceiver 228 of the master AP 310 to transmit a portion of a steered frame to the station devices 330A-330E. The portion of the steered frame may include content data (e.g., text, image, video, or any data). The steering controller 225 of the slave APs 320A, 320B may cause transceivers 228 of the slave APs 320A, 320B to transmit the portion of the steered frame to the station devices 330A-330E according to the synchronization information, while the master AP 310 transmits the portion of the steered frame. The joint transmission by the master AP 310 and the slave APs 320A, 320B allows the station devices 330A-330E to successfully receive and decode the portion of the steered frame and extract content data from the steered frame. Detailed descriptions on example frame formats and operations of steering are provided below with respect to FIGS. 10-13.

Figure 4:
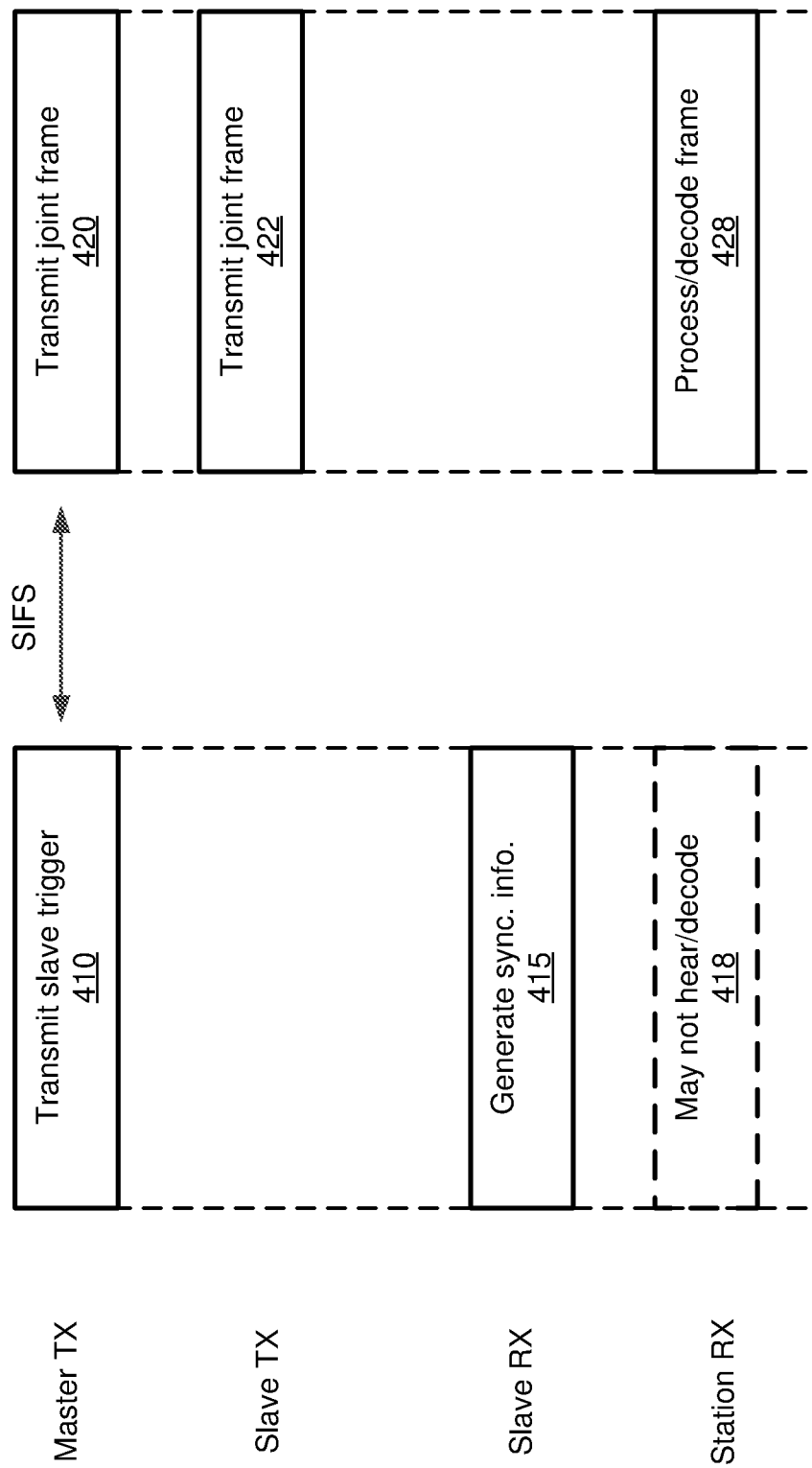
FIG. 4 illustrates an example timing diagram of a joint transmission by a master access point and a slave access point to a station device.

FIG. 4 illustrates an example timing diagram of a joint transmission by a master AP and a slave AP to a station device. In some embodiments, the soundings controller 222 of the master AP causes or configures its transceiver 228 to communicate with the slave AP and the station device. In some embodiments, the soundings controller 222 of the slave AP causes or configures its transceiver 228 to communicate with the master AP and the station device. In other embodiments, a different number of master APs, slave APs, or station devices may be included for the joint transmission.

In some embodiments, the soundings controller 222 of the master AP causes or configures the transceiver 228 of the master AP to transmit 410 a slave trigger frame to the slave AP. In some embodiments, a slave trigger frame is a frame transmitted by a master AP for triggering some or all slave APs to transmit a subsequent frame jointly. In one aspect, the slave trigger frame is similar to a trigger frame for HE TB PPDU in 802.11ax. In one aspect, the slave trigger frame may be replaced by a preamble of a subsequent frame. In some embodiments, the slave trigger frame indicates which slave APs to participate in the subsequent joint transmission, which could change dynamically from one joint TX to the next. In some embodiments, the slave trigger frame allows slave APs to estimate their CFO/SFO, phase-offset (PO), timing-offset (TO), a reference value for PO, and/or a reference value for TO relative to master AP, by means of long training fields (LTFs) included in the frame. In order to improve the accuracy of these estimates, the number of LTFs may be larger than the number sufficient for the channel estimation. In some embodiments, these LTFs may be located non-contiguously in the frame, e.g., in mid-ambles or in a post-amble. In some embodiments, the slave trigger frame contains PHY/MAC level information to construct and transmit subsequent frame jointly, e.g., and may contain frame-type/purpose, rate, receiver MAC address(es), payload, etc. In some embodiments, the slave trigger frame contains data for slave AP to be used in future joint AP transmissions either in a subsequent packet or within the same packet with some delay. In some embodiments, the soundings controller 222 of the slave AP causes or configures its transceiver 228 to receive the slave trigger frame, and decodes the slave trigger frame to generate 415 synchronization information by estimating CFO, SFO, PO, TO, a reference value for PO, and/or a reference value for TO with respect to the master AP. In one aspect, the slave trigger frame may not be successfully heard or decoded 418 by station devices.

In some embodiments, the soundings controller 222 of the master AP causes its transceiver 228 to transmit 420 a joint frame to a station device, for example, after a short inter-frame spacing (SIFS) following the end of the slave trigger frame. During the short inter-frame spacing, the master AP and the slave AP may not transmit. In one aspect, the soundings controller 222 of the slave AP causes its transceiver 228 to transmit 422 the joint frame to the station device, while the master AP transmits 420 the joint frame. The soundings controller 222 of the slave AP may correct for their CFO, SFO, PO, TO, a reference value for PO, and/or a reference value for TO with respect to the master AP and jointly transmit with the master AP. In one aspect, CSI-dependent steering vectors may not be applied, such that the joint transmission by the master AP and the slave AP may not be beamformed. In some embodiments, the joint transmission may be broadcast/multicast, or unicast in the absence of CSI. In one aspect, some or all APs transmit identical preambles and payloads in the joint frame, encoded at the same PHY rate. In some embodiments, the soundings controllers 222 of APs modulate signals for transmission with a different set of cyclic delays, to avoid unintentional beamforming, such as in 802.11n/ac/ax single-user transmissions.

In some embodiments, the station device receives the joint transmission by the master AP and the slave AP, and processes or decodes 428 the joint transmission. For example, the station device measures or determines signal strengths or signal qualities of the joint transmission, and generates channel estimation information indicating the measured signal strengths or signal qualities. In some embodiments, the station device transmits or provides the channel estimation information to the master AP, the slave AP, or any AP.

Figure 5:
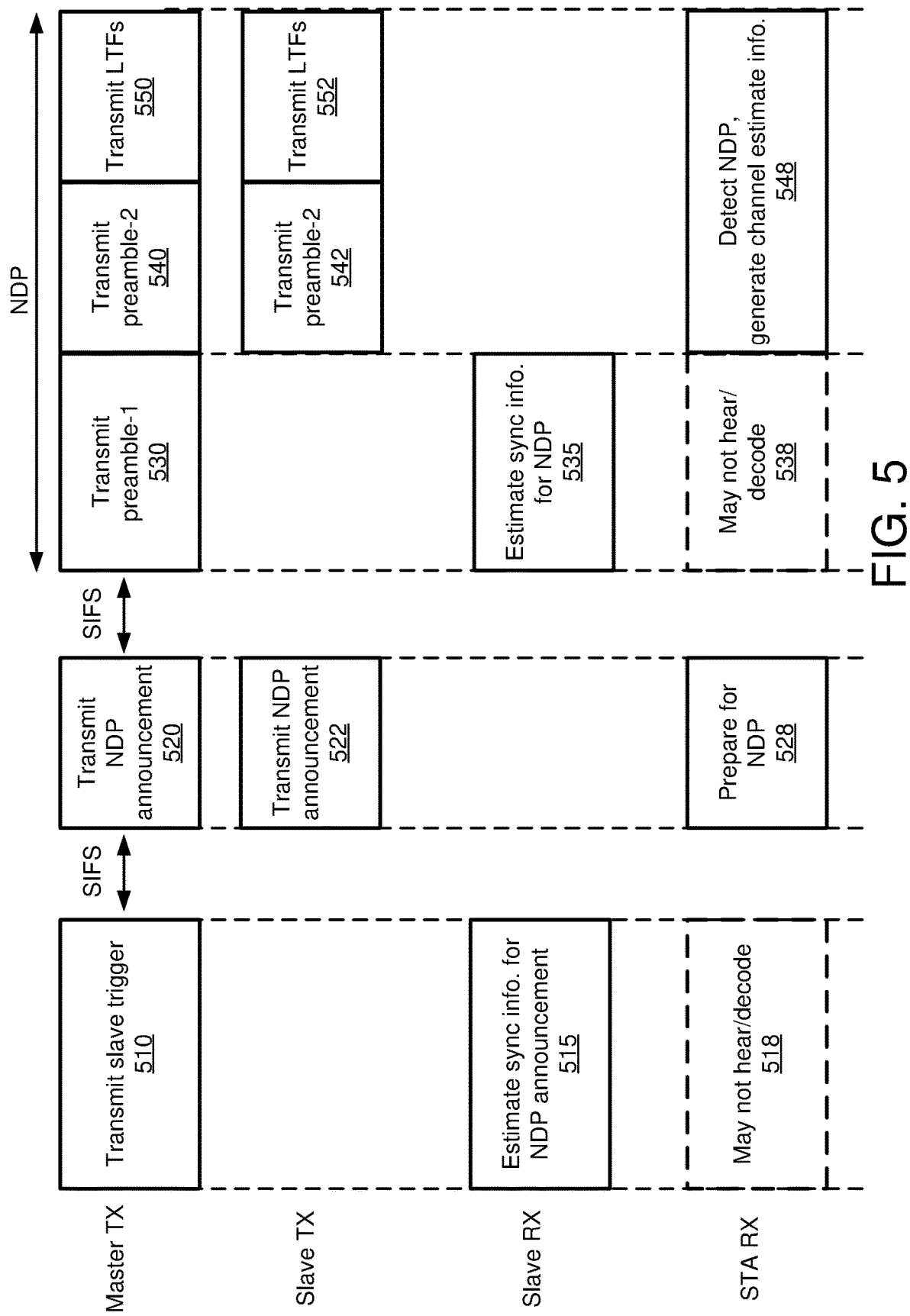
FIGS. 5-9 illustrate example timing diagrams of a sounding sequence, according to some embodiments.

FIG. 5 illustrates an example timing diagram of a sounding sequence, according to some embodiments. In some embodiments, the master AP and the slave AP perform a joint transmission for sounding. In other embodiments, a different number of master APs, slave APs, or station devices may be included for the joint transmission.

In some embodiments, the soundings controller 222 of the master AP configures or causes its transceiver to transmit 510 a slave trigger frame to the slave AP. In one aspect, the slave trigger frame alerts the slave AP to commence the sounding sequence. In one aspect, the slave trigger frame contains information to be transmitted in subsequent NDP announcement frame jointly with the slave AP jointly. In one aspect, the slave trigger frame indicates contents of preamble 2 and/or a number of LTFs in a NDP frame. The slave trigger frame may be decoded by some or all slave APs. In some embodiments, the soundings controller 222 of the slave AP estimates 515 synchronization information for an NDP announcement frame. For example, the soundings controller 222 of the slave AP measures or estimates CFO, SFO, PO, TO, a reference value for PO, and/or a reference value for TO relative to master AP, and synchronizes with the master AP for the subsequent NDP announcement frame according to the CFO, SFO, PO, TO, a reference value for PO, and/or a reference value for TO. In some embodiments, the station device 518 may or may not decode the slave trigger frame.

In some embodiments, the soundings controller 222 of the master AP causes its transceiver 228 to transmit 520 a NDP announcement frame to a station device, for example, after a SIFS following the end of the slave trigger frame. During the short inter-frame spacing, the master AP and the slave AP may not transmit. In some embodiments, an NDP announcement frame contains information on which station devices are expected to feedback channel information, and a type of channel information. In one aspect, the soundings controller 222 of the slave AP causes its transceiver 228 to transmit 522 the NDP announcement frame to the station device, while the master AP transmits 520 the NDP announcement frame. In one aspect, the slave AP synchronizes with the master AP, according to the synchronization information for the joint transmission of the NDP announcement frame. The station device may receive the joint transmission of the NDP announcement frame by the master AP and the slave AP, and prepare 528 for subsequent NDP frame, similar to HE/VHT sounding sequence. In some embodiments, the station device checks if the station device is on a list of devices supposed to receive the subsequent NDP frame.

In some embodiments, the soundings controller 222 of the master AP causes its transceiver 228 to transmit a NDP, for example, after a SIFS following the end of the NDP announcement frame. During the short inter-frame spacing, the master AP and the slave AP may not transmit. In some embodiments, the NDP frame includes a preamble 1, preamble 2, and LTFs. In one aspect, the preamble 1 is transmitted 530 by the master AP but not by the slave AP. In some embodiments, the slave AP receives the preamble 1 and estimates 535 or updates synchronization information (e.g., CFO, SFO, PO, TO, a reference value for PO, and/or a reference value for TO with respect to the master AP) according to the preamble 1. In one aspect, the preamble 1 allows the slave AP sufficient time to switch from a receive mode to a transmit mode for the joint transmission of the remaining portion of the NDP frame. In some embodiments, the preamble 1 indicates contents of a portion of a subsequent frame (e.g., preamble 2) and/or the number of LTFs. In some embodiments, the station device may not hear/decode 538 the preamble 1, or may choose to ignore the preamble 1.

In some embodiments, the soundings controller 222 of the master AP causes its transceiver 228 to transmit 540 the preamble 2 subsequent to the end of the preamble 1. In some embodiments, the soundings controller 222 of the slave AP causes its transceiver 228 to transmit 542 the preamble 2 to the station device according to the synchronization information, while the master AP transmits the preamble 2. In some embodiments, the joint transmission of the preamble 2 by the master AP and the slave AP causes or allows the station device to receive, decode, and/or process LTFs, such as a mixed-mode preamble in HE/VHT NDPs.

In some embodiments, the soundings controller 222 of the master AP causes its transceiver 228 to transmit 550 the LTF after the end of the preamble 2. In some embodiments, the soundings controller 222 of the slave AP configures its transceiver 228 to transmit 552 the LTF to the station device according to the synchronization information, while the master AP transmits 550 the LTF. In some embodiments, the joint transmission of the LTFs by the master AP and the slave AP instructs, causes or allows the station device to measure channels from the master AP and the slave AP. In one aspect, a total number of LTFs can exceed the maximum number of sounding dimensions supported by any single AP. In some embodiments, the master AP and the slave AP(s)

independently modulate the LTFs with different orthogonal codes (e.g., different rows of a Hadamard matrix, similar to HE UL MUMIMO transmission), for ease of separation at the station device. In some embodiments, the station device detects the NDP frame and generates 548 channel estimation information for downlink channels according to the LTFs. In one approach, the station device transmits the channel estimation information to the master AP and/or the slave AP. The integration module 221 of the master AP or the slave AP may integrate channel estimation information from station devices, and compute steering vectors for joint MU-MIMO transmission.

Figure 6:
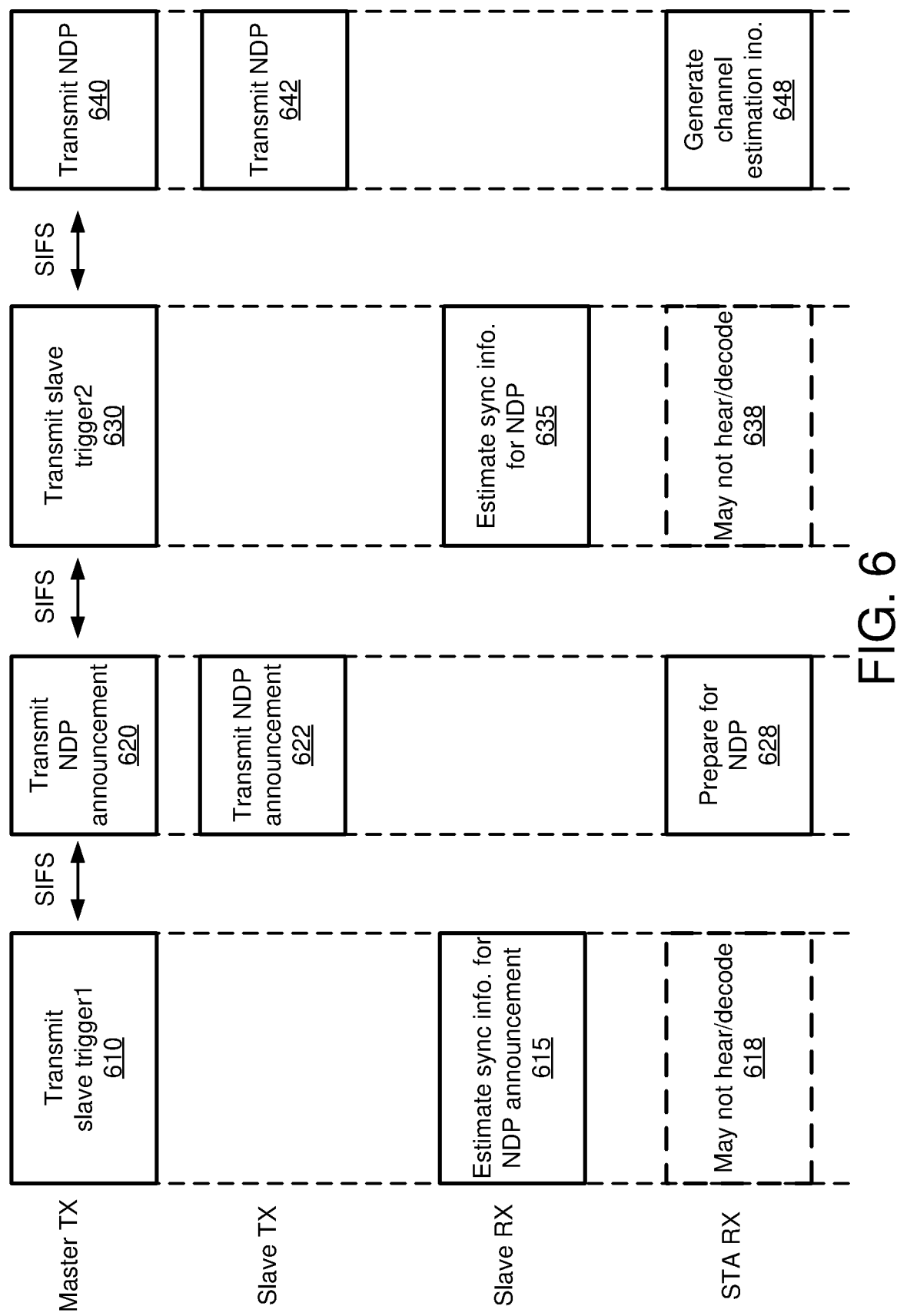

FIG. 6 illustrates an example timing diagram of another sounding sequence, according to some embodiments. In some embodiments, the master AP and the slave AP perform a joint transmission for sounding. In other embodiments, a different number of master APs, slave APs, or station devices may be included for the joint transmission.

In some embodiments, the soundings controller 222 of the master AP configures or causes its transceiver to transmit 610 a slave trigger frame 1 to the slave AP. In one aspect, the slave trigger 1 alerts the slave AP to commence the sounding sequence. In one aspect, the slave trigger frame 1 contains information to be transmitted in a subsequent NDP announcement frame with the slave AP jointly. In one aspect, the slave trigger frame 1 indicates contents of NDP frame and/or a number of LTFs in the NDP frame. The slave trigger frame 1 may be decoded by some or all slave APs. In some embodiments, the soundings controller 222 of the slave AP estimates 615 synchronization information for an NDP announcement frame. For example, the soundings controller 222 of the slave AP measures or estimates CFO, SFO, PO, TO, a reference value for PO, and/or a reference value for TO relative to master AP, and synchronizes with the master AP for the subsequent NDP announcement frame according to the CFO, SFO, PO, TO, a reference value for PO, and/or a reference value for TO. In some embodiments, the station device 618 may or may not decode the slave trigger frame 1.

In some embodiments, the soundings controller 222 of the master AP causes its transceiver 228 to transmit 620 a NDP announcement frame to a station device, for example, after a SIFS following the end of the slave trigger frame 1. During the short inter-frame spacing, the master AP and the slave AP may not transmit. In some embodiments, an NDP announcement frame contains information on which station devices are expected to feedback channel information, and a type of channel information. In one aspect, the soundings controller 222 of the slave AP causes its transceiver 228 to transmit 622 the NDP announcement frame to the station device, while the master AP transmits 620 the NDP announcement frame. In one aspect, the slave AP synchronizes with the master AP, according to the synchronization information for the joint transmission of the NDP announcement frame. The station device may receive the joint transmission of the NDP announcement frame by the master AP and the slave AP, and prepare 628 for subsequent NDP frame, similar to HE/VHT sounding sequence. In some embodiments, the station device checks if the station device is on a list of devices supposed to receive the subsequent NDP frame.

In some embodiments, the soundings controller 222 of the master AP causes its transceiver 228 to transmit 630 a slave trigger frame 2, for example, after a SIFS following the end of the NDP announcement frame. During the short inter-frame spacing, the master AP and the slave AP may not transmit. In one aspect, the slave trigger frame 2 is transmitted 630 by the master AP but not by the slave AP. In some embodiments, the soundings controller 222 of the slave AP configures the transceiver 228 of the slave AP to receive the slave trigger frame 2, and estimates 635 or updates synchronization information (e.g., CFO, SFO, PO, TO, a reference value for PO, and/or a reference value for TO with respect to the master AP) according to the slave trigger frame 2. In one aspect, the slave trigger frame 2 allows the slave AP sufficient time to switch from a receive mode to a transmit mode for the joint transmission of the NDP frame. In some embodiments, the slave trigger frame 2 indicates contents of the NDP frame and/or the number of LTFs in the NDP frame. In some embodiments, the station device may not hear/decode 638 the slave trigger frame 2, or may choose to ignore slave trigger frame 2.

In some embodiments, the soundings controller 222 of the master AP causes its transceiver 228 to transmit 640 the NDP, for example, after a SIFS following the end of the slave trigger frame 2. During the short inter-frame spacing, the master AP and the slave AP may not transmit. In some embodiments, the slave AP transmits 642 the NDP frame to the station device according to the synchronization information, while the master AP transmits 640 the NDP frame. In some embodiments, the joint transmission of the NDP frame by the master AP and the slave AP causes or allows the station device to receive, decode, and/or process LTFs, such as a mixed-mode preamble in HE/VHT NDPs. In some embodiments, the joint transmission of the NDP frame by the master AP and the slave AP instructs, causes or allows the station device to measure channels from the master AP and the slave AP. In one aspect, a total number of LTFs in the NDP frame can exceed the maximum number of sounding dimensions supported by any single AP. In some embodiments, the master AP and the slave AP(s) independently modulate the LTFs in the NDP frame with different orthogonal codes (e.g., different rows of a Hadamard matrix, similar to HE UL MUMIMO transmission), for ease of separation at the station device. In some embodiments, the station device detects the NDP frame and generates 648 channel estimation information for downlink channels according to the LTFs in the NDP frame. In one approach, the station device transmits the channel estimation information to the master AP and/or the slave AP. The integration module 221 of the master AP or the slave AP may integrate channel estimation information from station devices, and compute steering vectors for joint MU-MIMO transmission.

Figure 7:
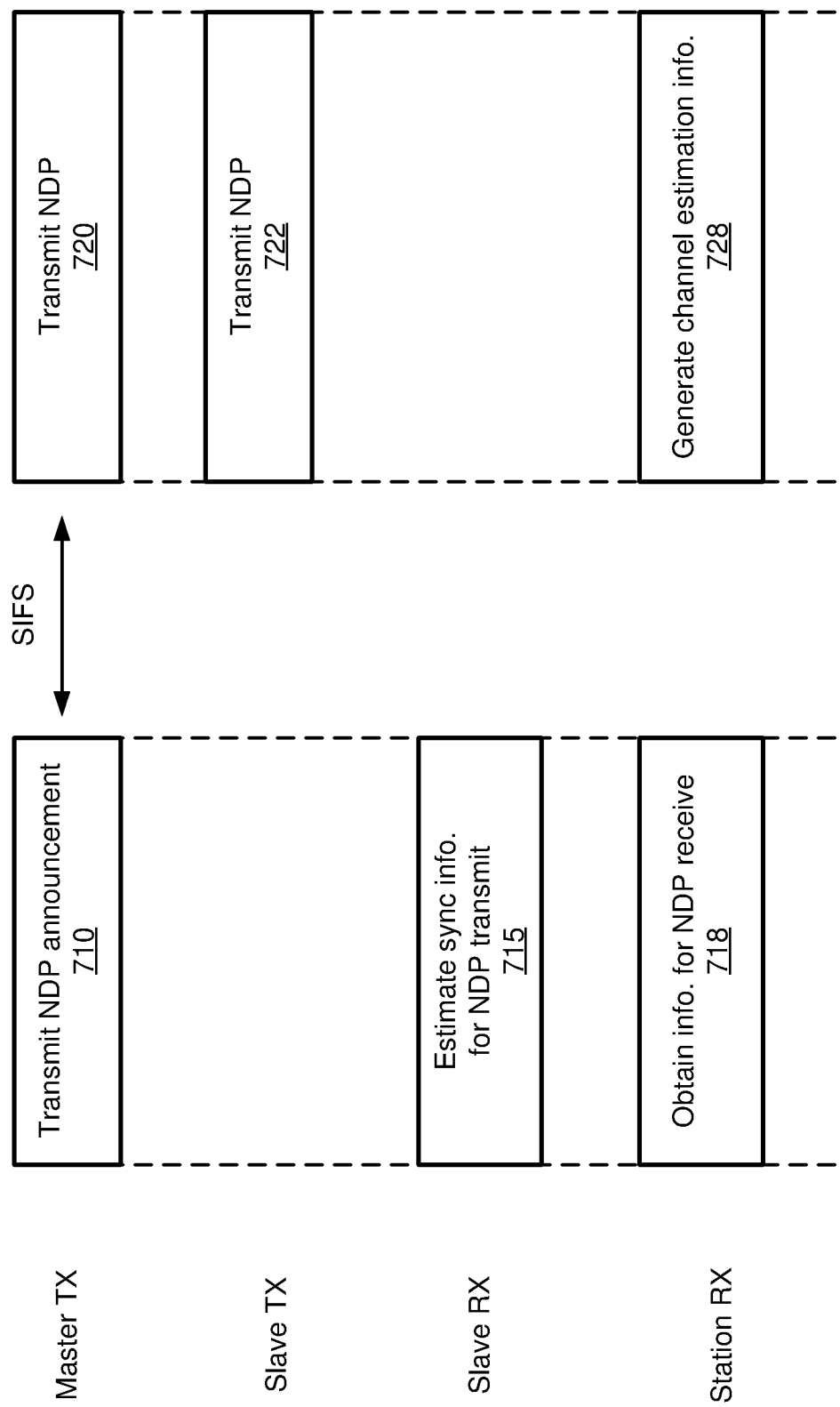

FIG. 7 illustrates an example timing diagram of another sounding sequence, according to some embodiments. In some embodiments, the master AP and the slave AP perform a joint transmission for sounding. In other embodiments, a different number of master APs, slave APs, or station devices may be included for the joint transmission.

In some embodiments, the soundings controller 222 of the master AP causes its transceiver 228 to transmit 710 a NDP announcement frame to the slave AP and the station device. In some embodiments, an NDP announcement frame notifies or indicates a joint transmission of NDP frame. The NDP announcement frame may contain information for station devices to process NDP and construct CSI feedback. In some embodiments, the NDP announcement frame serves as a slave trigger frame in FIG. 5 or FIG. 6. The NDP announcement frame may indicate participating slave APs for the joint transmission of NDP frame. The NDP announcement frame may allow slave APs to estimate CFO, SFO, PO, TO, a reference value for PO, and/or a reference value for TO relative to the master AP. Moreover, the NDP announcement frame may contain information on how to construct the NDP frame (e.g., a number of LTFs, etc.). In some embodiments, the soundings controller 222 of the slave AP configures the transceiver 228 of the slave AP to receive the NDP announcement frame, and estimates 715 or updates synchronization information (e.g., CFO, SFO, PO, TO, a reference value for PO, and/or a reference value for TO with respect to the master AP) according to the NDP announcement frame. In some embodiments, the NDP announcement frame indicates contents of the NDP frame and/or the number of LTFs in the NDP frame. In some embodiments, the station device receives and decodes the NDP announcement frame by the master AP, and obtains 718 information to receive or process the NDP and construct CSI feedback.

In some embodiments, the soundings controller 222 of the master AP causes its transceiver 228 to transmit 720 the NDP, for example, after a SIFS following the end of the NDP announcement frame. During the short inter-frame spacing, the master AP and the slave AP may not transmit. In some embodiments, the soundings controller 222 of the slave AP configures or causes the transceiver 228 of the slave AP to transmit 722 the NDP frame to the station device according to the synchronization information, while the master AP transmits 720 the NDP frame. In some embodiments, the joint transmission of the NDP frame by the master AP and the slave AP causes or allows the station device to receive, decode, and/or process LTFs in the NDP frame. In some embodiments, the joint transmission of the NDP frame by the master AP and the slave AP instructs, causes or allows the station device to measure channels from the master AP and the slave AP. In one aspect, a total number of LTFs in the NDP frame can exceed the maximum number of sounding dimensions supported by any single AP. In some embodiments, the master AP and the slave AP(s) independently modulate the LTFs in the NDP frame with different orthogonal codes (e.g., different rows of a Hadamard matrix, such as in HE UL MUMIMO transmission), for ease of separation at the station device. In some embodiments, the station device detects the NDP frame and generates 728 channel estimation information for downlink channels according to the LTFs in the NDP frame. In one approach, the station device transmits the channel estimation information to the master AP and/or the slave AP. The integration module 221 of the master AP or the slave AP may integrate channel estimation information from station devices, and compute steering vectors for joint MU-MIMO transmission.

Figure 8:
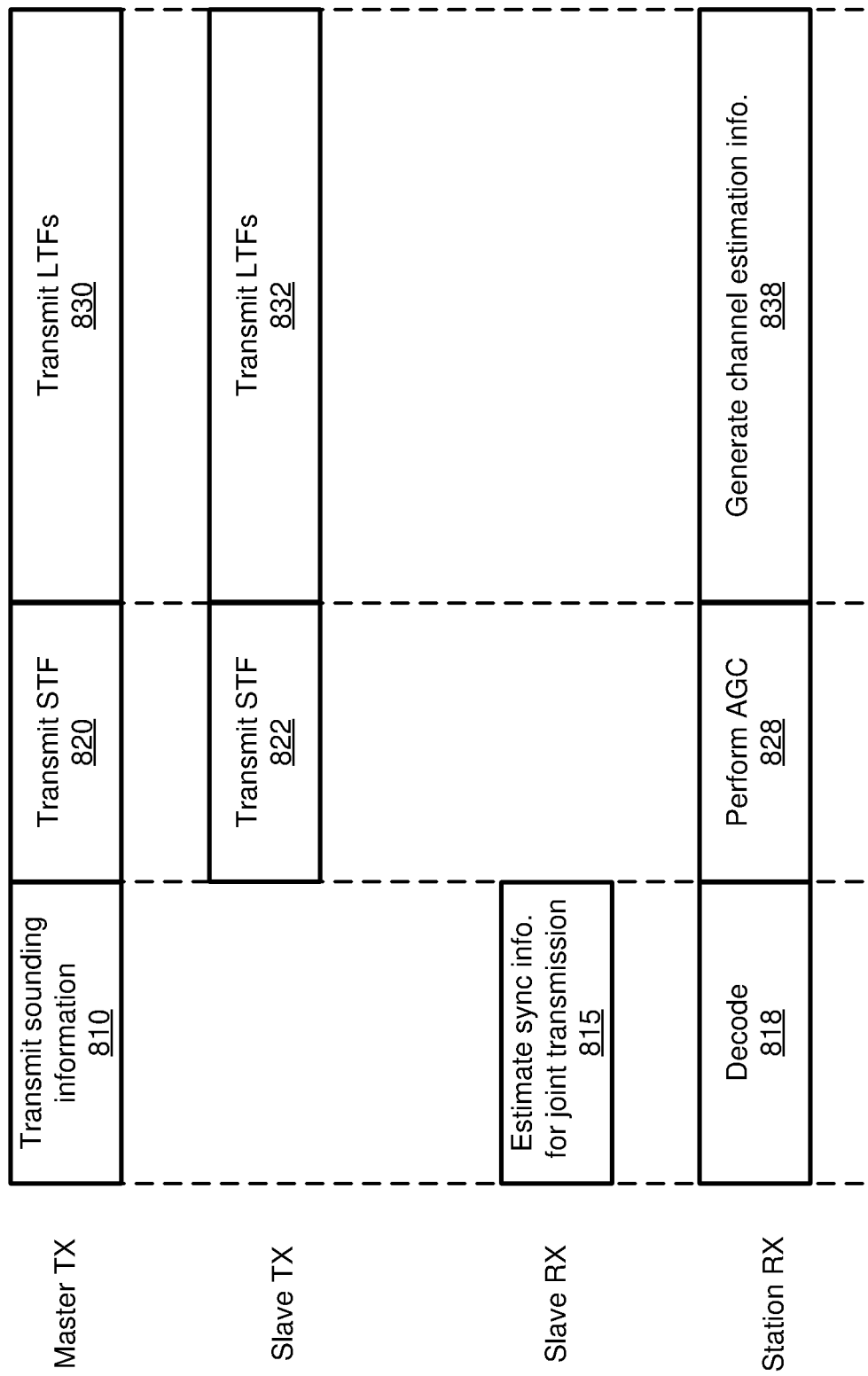

FIG. 8 illustrates an example timing diagram of another sounding sequence, according to some embodiments. In some embodiments, the master AP and the slave AP perform a joint transmission for sounding. In other embodiments, a different number of master APs, slave APs, or station devices may be included for the joint transmission.

In some embodiments, the soundings controller 222 of the master AP causes its transceiver 228 to transmit 810 a first portion of a frame (e.g., NDP frame) to the slave AP and the station device. In some embodiments, the first portion of the frame includes a preamble and a payload. In some embodiments, the preamble of the first portion of the frame could indicate special frame type to distinguish from other types of sounding sequences. In some embodiments, the first portion of the frame indicates a number of trailing LTFs, and positions of trailing STF and LTFs. In some embodiments, the first portion of the frame identifies participating stations and notifies sounding parameters, CSI expected, etc. In some embodiments, the first portion of the frame identifies participating slave APs, and allows estimation of CFO, SFO, PO, TO, a reference value for PO, and/or a reference value for TO with respect to the master AP. In some embodiments, the first portion of the frame allows slave APs to transition from a receive mode to a transmit mode. In some embodiments, the first portion of the frame serves as a slave trigger frame in FIG. 5 or FIG. 6. In some embodiments, the soundings controller 222 of the slave AP configures the transceiver 228 of the slave AP to receive the first portion of the frame, and estimates 815 or updates synchronization information (e.g., CFO, SFO, PO, TO, a reference value for PO, and/or a reference value for TO with respect to the master AP) according to the first portion of the frame. In some embodiments, the station device receives and decodes 818 the first portion of the frame transmitted by the master AP, and obtains information for CSI feedback estimation.

In some embodiments, the soundings controller 222 of the master AP causes its transceiver 228 to transmit 820 a second portion of the frame, subsequent to the first portion of the frame. In some embodiments, the second portion of the frame includes a short training field (STF). In some embodiments, the soundings controller 222 of the slave AP configures or causes the transceiver 228 of the slave AP to transmit 822 the second portion of the frame to the station device according to the synchronization information, while the master AP transmits the second portion of the frame. In some embodiments, the joint transmission of the second portion of the frame by the master AP and the slave AP causes or allows the station device to receive the second portion of the frame and perform 828 automatic gain control (AGC) or adjust gain settings.

In some embodiments, the soundings controller 222 of the master AP causes its transceiver 228 to transmit 830 a third portion of the frame, subsequent to the second portion of the frame. In some embodiments, the third portion of the frame includes a long training field (LTF). In some embodiments, the soundings controller 222 of the slave AP configures or causes the transceiver 228 of the slave AP to transmit 832 the third portion of the frame to the station device according to the synchronization information, while the master AP transmits 830 the third portion of the frame. In some embodiments, the joint transmission of the third portion of the frame by the master AP and the slave AP causes or allows the station device to receive, decode, and/or process LTFs in the third portion of the frame. In some embodiments, the joint transmission of the third portion of the frame by the master AP and the slave AP instructs, causes or allows the station device to measure channels from the master AP and the slave AP. In one aspect, a total number of LTFs in the third portion of the frame can exceed the maximum number of sounding dimensions supported by any single AP. In some embodiments, the master AP and the slave AP(s) independently modulate the LTFs in the third portion of the frame with different orthogonal codes (e.g., different rows of a Hadamard matrix, similar to HE UL MUMIMO transmission), for ease of separation at the station device. In some embodiments, the station device detects the third portion of the frame and generates 838 channel estimation information for downlink channels according to the LTFs in the third portion of the frame. In one approach, the station device transmits the channel estimation information to the master AP and/or the slave AP. The integration module 221 of the master AP or the slave AP may integrate channel estimation information from station devices, and compute steering vectors for joint MU-MIMO transmission.

Figure 9:
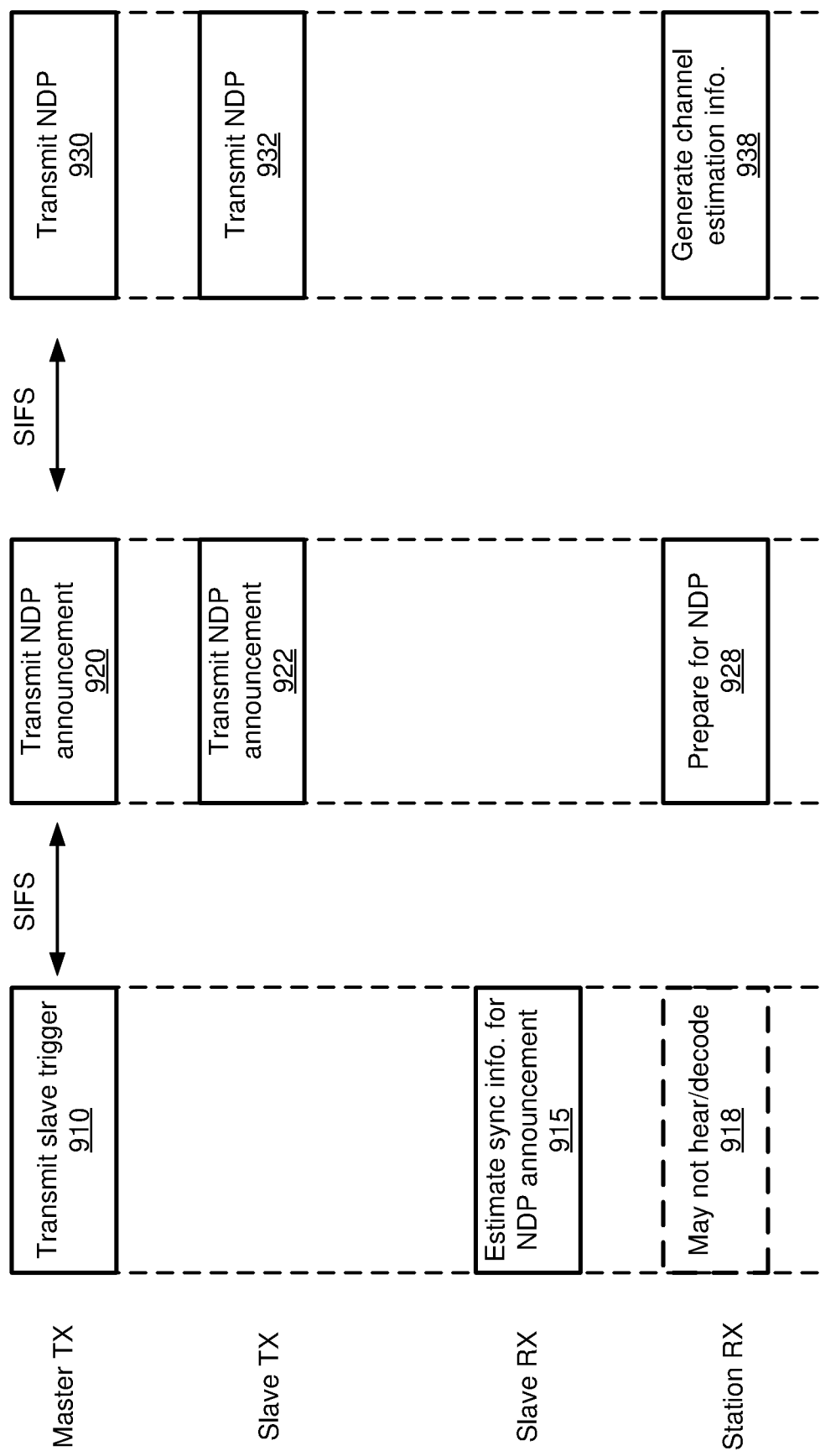

FIG. 9 illustrates an example timing diagram of another sounding sequence, according to some embodiments. In some embodiments, the master AP and the slave AP perform a joint transmission for sounding. In other embodiments, a different number of master APs, slave APs, or station devices may be included for the joint transmission.

In some embodiments, the soundings controller 222 of the master AP configures or causes its transceiver to transmit 910 a slave trigger frame to the slave AP. In one aspect, the slave trigger frame alerts the slave AP to commence the sounding sequence. In one aspect, the slave trigger frame contains information to be transmitted in subsequent NDP announcement frame with the slave AP jointly. In one aspect, the slave trigger frame indicates contents of NDP frame and/or a number of LTFs in the NDP frame. The slave trigger frame may be decoded by some or all slave APs. In some embodiments, the soundings controller 222 of the slave AP estimates 915 synchronization information (e.g., CFO, SFO, PO, TO, a reference value for PO, and/or a reference value for TO with respect to the master AP) for an NDP announcement frame. For example, the soundings controller 222 of the slave AP measures or estimates CFO, SFO, PO, TO, a reference value for PO, and/or a reference value for TO relative to master AP, and synchronizes with the master AP for the subsequent NDP announcement frame according to the CFO, SFO, PO, TO, a reference value for PO, and/or a reference value for TO. In some embodiments, the station device 918 may or may not decode the slave trigger frame.

In some embodiments, the soundings controller 222 of the master AP causes its transceiver 228 to transmit 920 a NDP announcement frame to a station device, for example, after a SIFS following the end of the slave trigger frame. During the short inter-frame spacing, the master AP and the slave AP may not transmit. In some embodiments, an NDP announcement frame contains information on which station devices are expected to feedback channel information, and a type of channel information. In one aspect, the soundings controller 222 of the slave AP causes its transceiver 228 to transmit 922 the NDP announcement frame to the station device, while the master AP transmits 920 the NDP announcement frame. In one aspect, the slave AP synchronizes with the master AP, according to the synchronization information for the joint transmission of the NDP announcement frame. The station device may receive the joint transmission of the NDP announcement frame by the master AP and the slave AP, and prepare 928 for subsequent NDP frame, similar to HE/VHT sounding sequence. In some embodiments, the station device checks if the station device is on a list of devices supposed to receive the subsequent NDP frame.

In some embodiments, the soundings controller 222 of the master AP causes its transceiver 228 to transmit 930 the NDP, for example, after a SIFS following the end of the NDP announcement frame. During the short inter-frame spacing, the master AP and the slave AP may not transmit. In some embodiments, the slave AP transmits 932 the NDP frame to the station device according to the synchronization information, while the master AP transmits 930 the NDP frame. In some embodiments, the joint transmission of the NDP frame by the master AP and the slave AP causes or allows the station device to receive, decode, and/or process LTFs, such as in a mixed-mode preamble in HE/VHT NDPs. In some embodiments, the joint transmission of the NDP frame by the master AP and the slave AP instructs, causes or allows the station device to measure channels from the master AP and the slave AP. In one aspect, a total number of LTFs in the NDP frame can exceed the maximum number of sounding dimensions supported by any single AP. In some embodiments, the master AP and the slave AP(s) independently modulate the LTFs in the NDP frame with different orthogonal codes (e.g., different rows of a Hadamard matrix, similar to HE UL MUMIMO transmission), for ease of separation at the station device. In some embodiments, the station device detects the NDP frame and generates 938 channel estimation information for downlink channels according to the LTFs in the NDP frame. In one approach, the station device transmits the channel estimation information to the master AP and/or the slave AP. The integration module 221 of the master AP or the slave AP may integrate channel estimation information from station devices, and compute steering vectors for joint MU-MIMO transmission.

Figure 10:
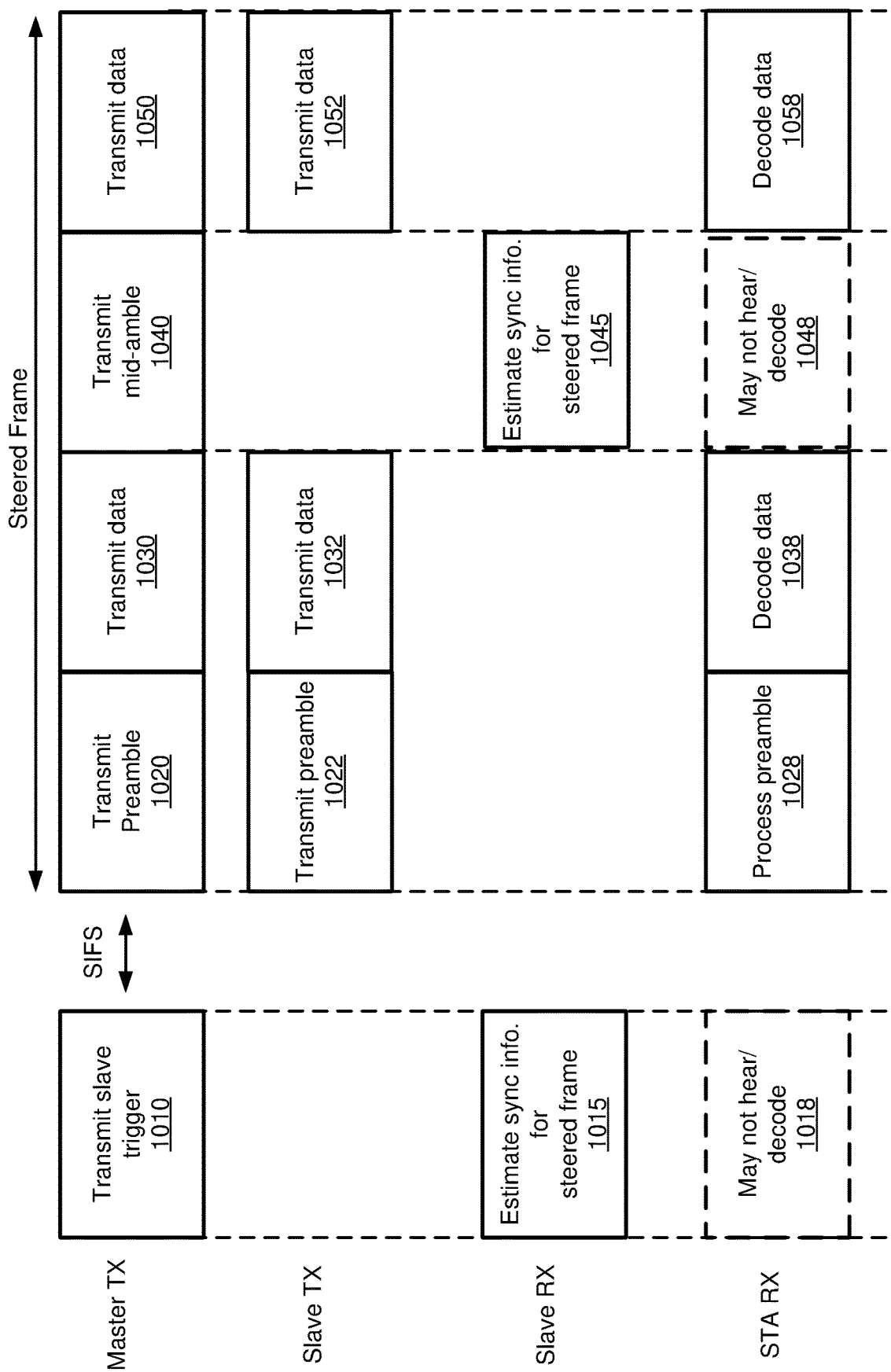
FIGS. 10-13 illustrate example timing diagrams of a steering sequence, according to some embodiments.

FIG. 10 illustrates an example timing diagram of a steering sequence, according to some embodiments. In some embodiments, the master AP and the slave AP perform a joint transmission for steering. In other embodiments, a different number of master APs, slave APs, or station devices may be included for the joint transmission.

In some embodiments, the steering controller 225 of the master AP configures or causes its transceiver to transmit 1010 a slave trigger frame to the slave AP. In one aspect, the slave trigger frame alerts the slave AP to commence the steering sequence. In one aspect, the slave trigger frame includes a preamble that allows the slave AP to determine or estimate synchronization information. In one aspect, the slave trigger frame includes a payload indicating how to construct a steered frame (e.g., targeted station devices for steered frame, PHY/MAC transmission parameters for each station device, which data frames to transmit to each station device, etc.). In one approach, the steering controller 225 of the slave AP computes steering vectors for a joint transmission of the steered frame to the indicated station devices. The slave trigger frame may be decoded by some or all slave APs. In some embodiments, the steering controller 225 of the slave AP estimates 1015 synchronization information for a steered frame. For example, the steering controller 225 of the slave AP measures or estimates CFO, SFO, PO, TO relative to master AP, and synchronizes with the master AP for the subsequent steered frame according to the CFO, SFO, PO, TO. In some embodiments, PO, TO, or a combination of PO and TO is not determined during the sounding sequence, and the steering controller 225 of the slave AP may determine, in the step 1015, a change in PO and/or TO between the sounding sequence and the steering sequence as described above with respect to Eq. (1)-Eq. (4). In some embodiments, the station device may or may not decode 1018 the slave trigger frame.

In some embodiments, the steering controller 225 of the master AP causes its transceiver 228 to transmit 1020 a preamble of the steered frame to a station device, for example, after a SLFS following the end of the slave trigger frame. During the short inter-frame spacing, the master AP and the slave AP may not transmit. In some embodiments, the steering controller 225 of the slave AP causes its transceiver 228 to transmit 1022 the preamble of the steered frame to the station device, while the master AP transmits 1020 the preamble to the station device. In some embodiments, the station device receives and processes 1028 the preamble. In one aspect, the station device prepares for a subsequent transmission of data. In some embodiments, the station device estimates or determines a field (e.g., signal field) that includes information to decode the payload in the subsequent joint transmission by the master AP and the slave AP. In one aspect, the master AP and the slave AP jointly transmit the steered frame by applying respective steering vectors indicated in the steering information. In one aspect, the steering controller 225 of the slave AP compensates for CFO, SFO, TO, PO, a reference value for PO, and/or a reference value for TO for the joint transmission of the preamble according to the synchronization information.

In some embodiments, the steering controller 225 of the master AP causes its transceiver 228 to transmit 1030 content data of the steered frame to the station device, for example, after the preamble. In some embodiments, the steering controller 225 of the slave AP causes its transceiver 228 to transmit 1032 the content data of the steered frame to the station device, while the master AP transmits 1030 the content data to the station device. In some embodiments, the station device receives and decodes 1038 the joint transmission of the content data.

In some embodiments, the steering controller 225 of the master AP causes its transceiver to transmit 1040 a mid-amble of the steered frame, for example, after transmitting 1030 content data. In some embodiments, the steering controller 225 of the slave AP estimates 1045 or adjusts synchronization information for the remaining portion of the steered frame. For example, the steering controller 225 of the slave AP measures or adjusts CFO, SFO, PO, TO, a reference value for PO, and/or a reference value for TO relative to the master AP. In some embodiments, PO, TO, or a combination of PO and TO is not determined during the sounding sequence, and the steering controller 225 of the slave AP may determine, in the step 1045, a change in PO and/or TO between the sounding sequence and the steering sequence as described above with respect to Eq. (1)-Eq. (4). In one aspect, the slave AP may not transmit, while the master AP transmits 1040 the mid-amble. In some embodiments, the station device may or may not decode 1048 the slave trigger frame. In some embodiments, the slave AP updates the synchronization information for the rest of the frame by using the content of the mid-amble. In some embodiments, the mid-amble allows sufficient time for the slave APs to switch from a transmit mode to a receive mode before updating the synchronization information and switch back to the transmit mode after updating the synchronization information.

In some embodiments, the steering controller 225 of the master AP causes its transceiver 228 to transmit 1050 content data of the steered frame to the station device, for example, after the mid-amble. In some embodiments, the steering controller 225 of the slave AP causes its transceiver 228 to transmit 1052 the content data of the steered frame to the station device, while the master AP transmits 1050 the content data to the station device. In some embodiments, the station device receives and decodes 1058 the joint transmission of the content data. In some embodiments, during the transmission 1052, the slave APs use the updated synchronization information obtained from the mid-amble to jointly transmit along with the master AP.

Figure 11:
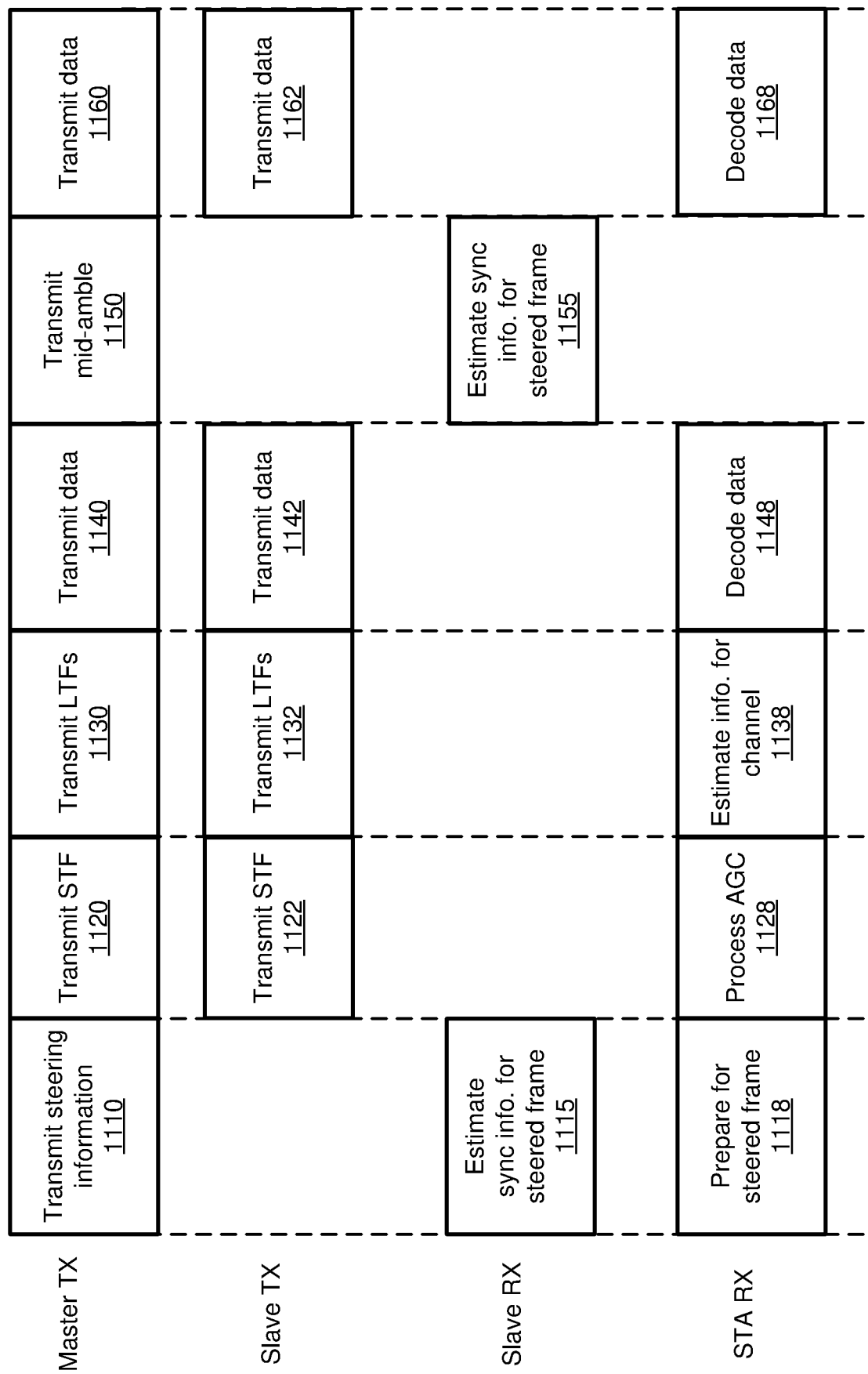

FIG. 11 illustrates an example timing diagram of a steering sequence, according to some embodiments. In some embodiments, the master AP and the slave AP perform a joint transmission for steering. In other embodiments, a different number of master APs, slave APs, or station devices may be included for the joint transmission.

In some embodiments, the steering controller 225 of the master AP configures or causes its transceiver to transmit 1110 steering information of a frame (e.g., a slave trigger frame) to the slave AP. In one aspect, the steering information of the frame alerts the slave AP to commence the steering sequence. In one aspect, the steering information of the frame includes a preamble and a payload. The preamble of the steering information may indicate a frame type to distinguish from other types of frames. In some embodiments, the steering information of the frame provides information for the steering controller 225 of the slave AP to decode a portion of the frame to extract content data. In one aspect, the steering information of the frame indicates a presence of any mid-amble in the frame. In one aspect, the steering information of the frame serves as the slave trigger frame of FIG. 10. In one approach, the steering controller 225 of the slave AP computes steering vectors for a joint transmission of the frame to the indicated station devices. The steering information of the frame may be decoded by some or all slave APs. In some embodiments, the steering controller 225 of the slave AP estimates 1115 synchronization information for the frame (e.g., steered frame). For example, the steering controller 225 of the slave AP measures or estimates CFO, SFO, PO, TO, a reference value for PO, and/or a reference value for TO relative to master AP, and synchronizes with the master AP for the subsequent steered frame according to the CFO, SFO, PO, TO, a reference value for PO, and/or a reference value for TO. In some embodiments, PO, TO, or a combination of PO and TO is not determined during the sounding sequence, and the steering controller 225 of the slave AP may determine, in the step 1115, a change in PO and/or TO between the sounding sequence and the steering sequence as described above with respect to Eq. (1)-Eq. (4). In one aspect, the station device receives the joint transmission of the steering information of the frame and prepares 1118 to decode the remaining portion of the steered frame. In some embodiments, the station device estimates or determines a field (e.g., signal field) that includes information to decode the payload in the subsequent joint transmission by the master AP and the slave AP.

In some embodiments, the steering controller 225 of the master AP causes its transceiver 228 to transmit 1120 a STF of the frame (e.g., steered frame) to a station device, for example, after transmitting the steering information. In some embodiments, the steering controller 225 of the slave AP causes its transceiver 228 to transmit 1122 the STF of the frame to the station device, while the master AP transmits 1120 the STF to the station device. In some embodiments, the master AP and the slave AP jointly transmit the steered frame by applying respective steering vectors indicated in the steering information. In some embodiments, the STF transmitted by the master AP and the slave AP allows the station device to perform 1128 automatic gain control (AGC) or adjust gain settings.

In some embodiments, the steering controller 225 of the master AP causes its transceiver 228 to transmit 1130 a LTF of the frame (e.g., steered frame) to a station device, for example, after transmitting the STF. In some embodiments, the steering controller 225 of the slave AP causes its transceiver 228 to transmit 1132 the LTF of the frame to the station device, while the master AP transmits 1130 the LTF to the station device. In some embodiments, the master AP and the slave AP jointly transmit the steered frame by applying respective steering vectors indicated in the steering information. In some embodiments, the LTF transmitted by the master AP and the slave AP allows the station device to estimate 1138 channel information. According to the channel estimation, the station device may decode data from the joint transmission by the master AP and the slave AP.

In some embodiments, the steering controller 225 of the master AP causes its transceiver 228 to transmit 1140 content data of the steered frame to the station device, for example, after the preamble. In some embodiments, the steering controller 225 of the slave AP causes its transceiver 228 to transmit 1142 the content data of the steered frame to the station device, while the master AP transmits 1140 the content data to the station device. In some embodiments, the station device receives and decodes 1148 the joint transmission of the content data.

In some embodiments, the steering controller 225 of the master AP causes its transceiver to transmit 1150 a mid-amble of the steered frame, for example, after transmitting 1140 content data. In some embodiments, the steering controller 225 of the slave AP estimates 1155 or adjusts synchronization information for the remaining portion of the steered frame. For example, the steering controller 225 of the slave AP measures or adjusts CFO, SFO, PO, TO, a reference value for PO, and/or a reference value for TO relative to the master AP. In some embodiments, PO, TO, or a combination of PO and TO is not determined during the sounding sequence, and the steering controller 225 of the slave AP may determine or update, in the step 1155, a change in PO and/or TO between the sounding sequence and the steering sequence as described above with respect to Eq. (1)-Eq. (4). In one aspect, the slave AP may not transmit, while the master AP transmits 1150 the mid-amble. In some embodiments, the station device may or may not decode the slave trigger frame. In some embodiments, the slave AP updates the synchronization information for one or more subsequent frames by using the content of the mid-amble. In some embodiments, the mid-amble allows sufficient time for the slave APs to switch from a transmit mode to a receive mode before updating the synchronization information and switch back to the transmit mode after updating the synchronization information.

In some embodiments, the steering controller 225 of the master AP causes its transceiver 228 to transmit 1160 content data of the steered frame to the station device, for example, after the mid-amble. In some embodiments, the steering controller 225 of the slave AP causes its transceiver 228 to transmit 1162 the content data of the steered frame to the station device, while the master AP transmits 1160 the content data to the station device. In some embodiments, the station device receives and decodes 1168 the joint transmission of the content data. In some embodiments, during the transmission 1162, the slave APs use the updated synchronization information obtained from the mid-amble to jointly transmit along with the master AP.

Figure 12:
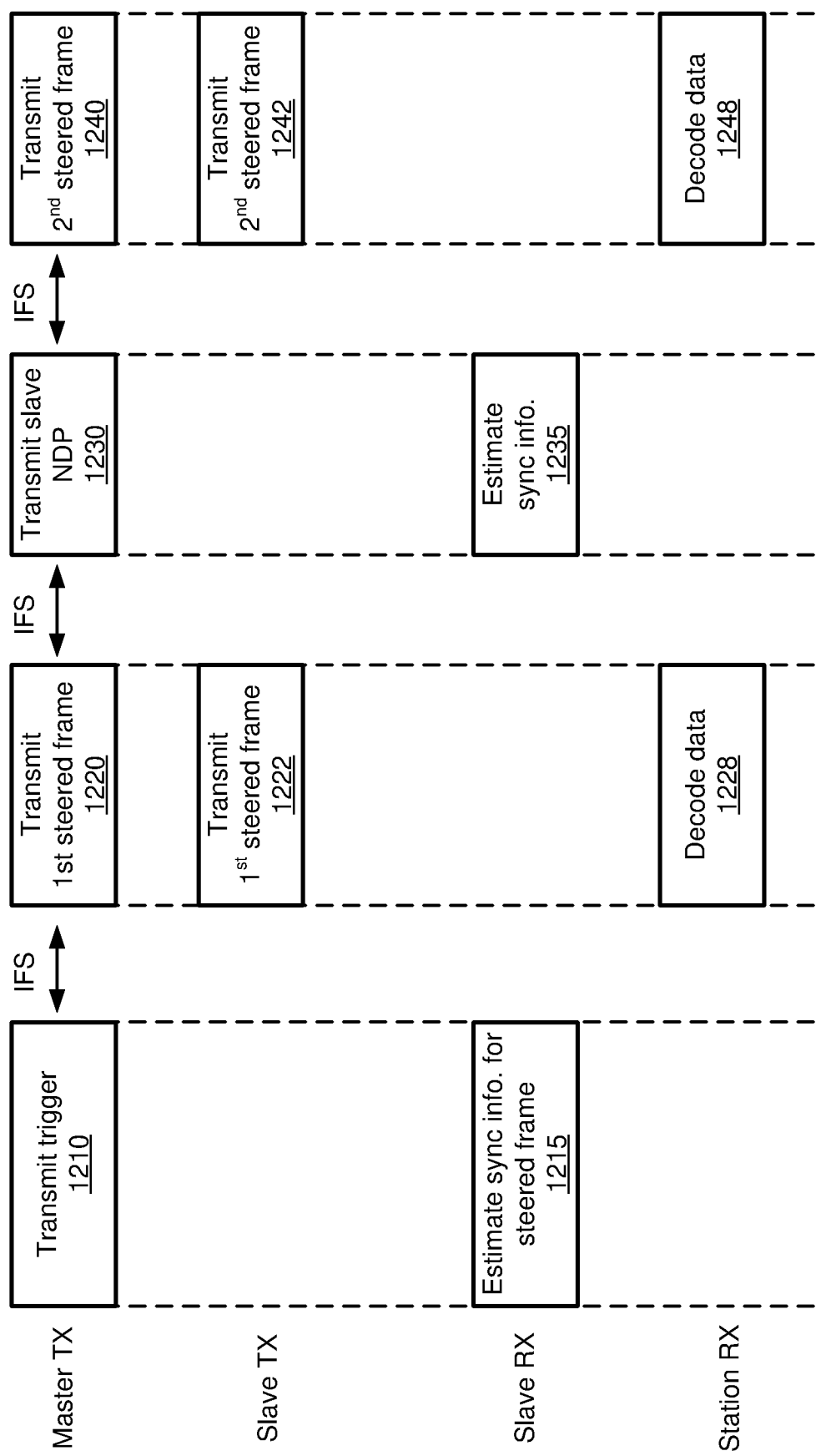

FIG. 12 illustrates an example timing diagram of a steering sequence, according to some embodiments. In some embodiments, the master AP and the slave AP perform a joint transmission for steering. In other embodiments, a different number of master APs, slave APs, or station devices may be included for the joint transmission.

In some embodiments, the steering controller 225 of the master AP configures or causes its transceiver to transmit 1210 a slave trigger frame to the slave AP. In one aspect, the slave trigger frame alerts the slave AP to commence the steering sequence. In one aspect, the slave trigger frame instructs, causes, or allows the slave AP to determine or estimate synchronization information. In one approach, the steering controller 225 of the slave AP computes steering vectors for a joint transmission of the first steered frame to the indicated station devices. The slave trigger frame may be decoded by some or all slave APs. In some embodiments, the steering controller 225 of the slave AP estimates 1215 synchronization information for the first steered frame. For example, the steering controller 225 of the slave AP measures CFO, SFO, PO, TO, a reference value for PO, and/or a reference value for TO relative to master AP, and synchronizes with the master AP for the joint transmission of the first steered frame. In some embodiments, PO, TO, or a combination of PO and TO is not determined during the sounding sequence, and the steering controller 225 of the slave AP may determine, in the step 1215, a change in PO and/or TO between the sounding sequence and the steering sequence as described above with respect to Eq. (1)-Eq. (4). In some embodiments, the station device may or may not decode the slave trigger frame.

In some embodiments, the steering controller 225 of the master AP causes its transceiver 228 to transmit 1220 the first steered frame including content data to the station device, for example, after an SIFS (e.g., 16 µs) or less following the end of the slave trigger frame. In some embodiments, the master AP and the slave AP may not transmit during the IFS. In some embodiments, the steering controller 225 of the slave AP causes its transceiver 228 to transmit 1222 the first steered frame to the station device, while the master AP transmits 1220 the first steered frame to the station device. In some embodiments, the master AP and the slave AP jointly transmit the first steered frame by applying respective steering vectors indicated in the steering information. In some embodiments, the station device receives and decodes 1228 the joint transmission of the content data.

In some embodiments, the steering controller 225 of the master AP configures or causes its transceiver to transmit 1230 a slave NDP frame to the slave AP, for example, after an inter-frame spacing following the end of the first steered frame. In some embodiments, the IFS may be SIFS (e.g., 16 µs) or less. In one aspect, the slave NDP frame includes a preamble and extra LTFs, with no content data. In one aspect, the slave NDP frame serves as the mid-amble of FIG. 10 or FIG. 11. In one aspect, the slave trigger frame instructs, causes, or allows the slave AP to determine or estimate synchronization information. In some embodiments, the steering controller 225 of the slave AP estimates 1235 synchronization information for a second steered frame. For example, the steering controller 225 of the slave AP measures or estimates CFO, SFO, PO, TO, a reference value for PO, and/or a reference value for TO relative to master AP, and synchronizes with the master AP for the second steered frame according to the CFO, SFO, PO, TO, a reference value for PO, and/or a reference value for TO. In some embodiments, PO, TO, or a combination of PO and TO is not determined during the sounding sequence, and the steering controller 225 of the slave AP may determine or update, in the step 1235, a change in PO and/or TO between the sounding sequence and the steering sequence as described above with respect to Eq. (1)-Eq. (4). In some embodiments, the station device may or may not decode the slave trigger frame.

In some embodiments, the steering controller 225 of the master AP causes its transceiver 228 to transmit 1240 the second steered frame including content data to the station device, for example, after an IFS following the end of the slave NDP frame. In some embodiments, the IFS may be SIFS (e.g., 16 µs) or less. In some embodiments, the master AP and the slave AP may not transmit during the IFS. In some embodiments, the steering controller 225 of the slave AP causes its transceiver 228 to transmit 1242 the second steered frame to the station device, while the master AP transmits 1240 the second steered frame to the station device. In some embodiments, the slave AP uses the estimated or updated synchronization information obtained in the step 1235 for the transmission 1242. In some embodiments, the master AP and the slave AP jointly transmit the second steered frame by applying respective steering vectors indicated in the steering information. In some embodiments, the station device receives and decodes 1248 the joint transmission of the content data.

In one aspect, transmission through the first steered frame and the second steered frame with the NDP frame in between can protect against or correct for any phase drift (e.g., drift from CFO). In one aspect, a larger time-separation between steered frames as shown in FIG. 12 allows the slave APs to compare LTFs across multiple slave NDP frames and/or slave trigger frames to improve CFO estimation. In one aspect, IFS among different frames may vary or change. In some embodiments, time allocated to the first steered frame and the second steered frame may be different. For example, time allocated for the first steered frame may be shorter than time allocated for the second steered frame, because the CFO estimation can be more accurate after the estimation based on the slave NDP.

Figure 13:
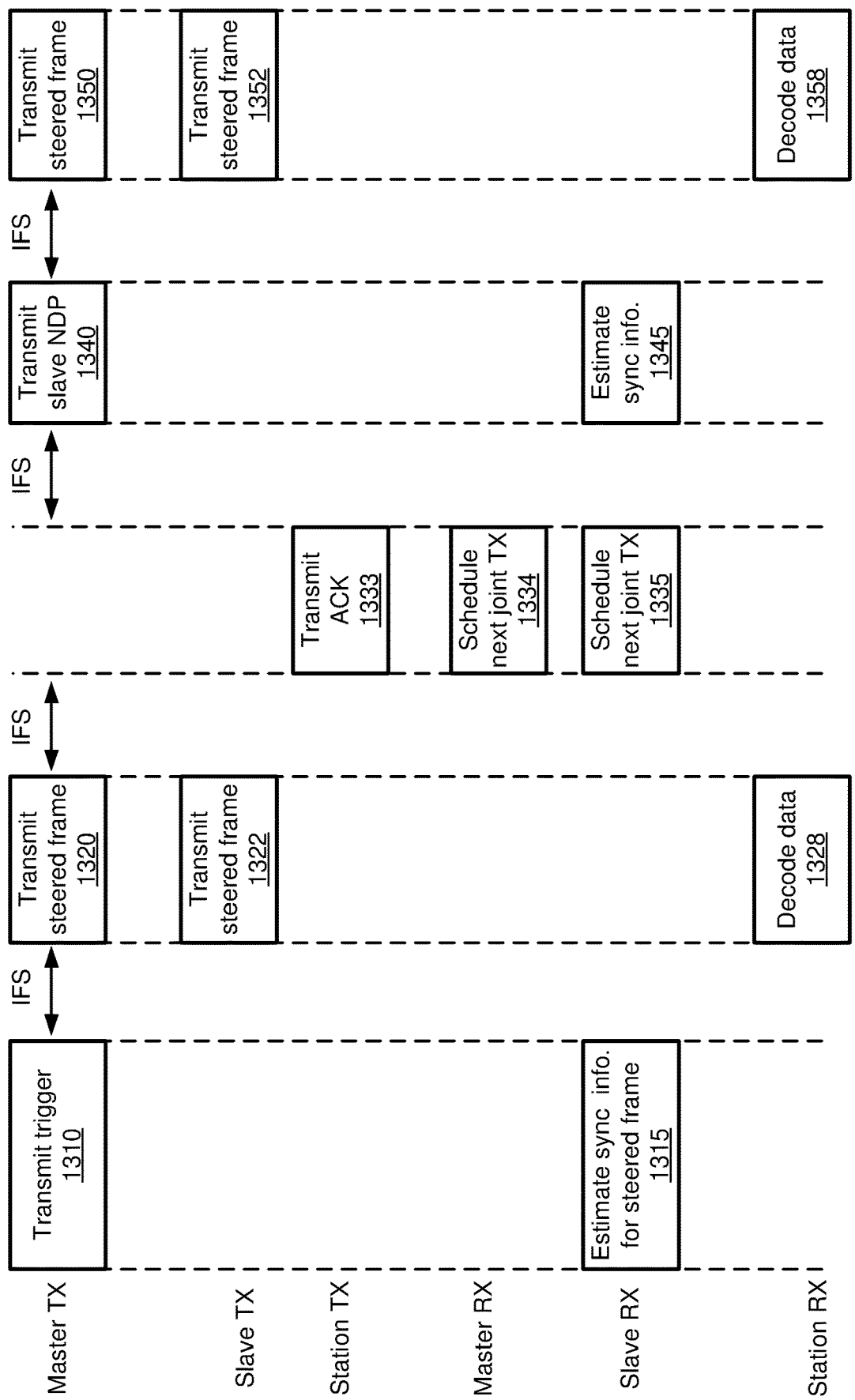

FIG. 13 illustrates an example timing diagram of a steering sequence, according to some embodiments. In some embodiments, the master AP and the slave AP perform a joint transmission for steering. In other embodiments, a different number of master APs, slave APs, or station devices may be included for the joint transmission.

In some embodiments, the steering controller 225 of the master AP configures or causes its transceiver to transmit 1310 a slave trigger frame to the slave AP. In one aspect, the slave trigger frame alerts the slave AP to commence the steering sequence. In one aspect, the slave trigger frame instructs, causes, or allows the slave AP to determine or estimate synchronization information. In one approach, the steering controller 225 of the slave AP computes steering vectors for a joint transmission of the first steered frame to the indicated station devices. The slave trigger frame may be decoded by some or all slave APs. In some embodiments, the steering controller 225 of the slave AP estimates 1315 synchronization information for the first steered frame. For example, the steering controller 225 of the slave AP measures CFO, SFO, PO, TO, a reference value for PO, and/or a reference value for TO relative to master AP, and synchronizes with the master AP for the first steered frame. In some embodiments, PO, TO, or a combination of PO and TO is not determined during the sounding sequence, and the steering controller 225 of the slave AP may determine, in the step 1315, a change in PO and/or TO between the sounding sequence and the steering sequence as described above with respect to Eq. (1)-Eq. (4). In some embodiments, the station device may or may not decode the slave trigger frame.

In some embodiments, the steering controller 225 of the master AP causes its transceiver 228 to transmit 1320 the first steered frame including content data to the station device, for example, after an IFS following the end of the slave trigger frame. In some embodiments, the master AP and the slave AP may not transmit during the IFS. In some embodiments, the steering controller 225 of the slave AP causes its transceiver 228 to transmit 1322 the first steered frame to the station device, while the master AP transmits 1320 the first steered frame to the station device. In some embodiments, the master AP and the slave AP jointly transmit the first steered frame by applying respective steering vectors indicated in the steering information. In one aspect, IFS among different frames may vary or change. In some embodiments, time allocated to the first steered frame and the second steered frame may be different. In some embodiments, the station device receives and decodes 1328 the joint transmission of the content data.

In some embodiments, the station device transmits 1333 an acknowledgement frame, acknowledging a successful receipt of the first steered frame. In some embodiments, different station devices may sequentially or jointly transmit the acknowledgement frame, for example through UL-OFDMA or UL MU-MIMO. In some embodiments, the steering controller 225 of the master AP and the steering controller 225 of the slave AP receive and schedule 1334, 1335 the joint transmission of the second steered frame. For example, steering controllers 225 of the master AP and the slave AP decide which data to jointly transmit in the second steered frame as well as the MCS/Nss to use for encoding (e.g., whether to re-transmit un-ACKed frames at a different MCS, etc.), based on a previously negotiated policy, according to the ACK frame received.

In some embodiments, the steering controller 225 of the master AP configures or causes its transceiver to transmit 1340 a slave NDP frame to the slave AP, for example, after an IFS following acknowledgement. In some embodiments, the IFS before the NDP frame may be SIFS (e.g., 16 µs) or less. In one aspect, the slave NDP frame includes a preamble and possibly extra LTFs, with no content data. In one aspect, the slave NDP frame serves as the mid-amble of FIG. 10 or FIG. 11. In one aspect, the slave trigger frame instructs, causes, or allows the slave AP to determine or estimate synchronization information. In some embodiments, the steering controller 225 of the slave AP estimates 1345 synchronization information for a second steered frame. For example, the steering controller 225 of the slave AP measures or estimates CFO, SFO, PO, TO, a reference value for PO, and/or a reference value for TO relative to master AP, and synchronizes with the master AP for the second steered frame according to the CFO, SFO, PO, TO, a reference value for PO, and/or a reference value for TO. In some embodiments, PO, TO, or a combination of PO and TO is not determined during the sounding sequence, and the steering controller 225 of the slave AP may determine, in the step 1345, a change in PO and/or TO between the sounding sequence and the steering sequence as described above with respect to Eq. (1)-Eq. (4). In some embodiments, the station device may or may not decode the slave trigger frame.

In some embodiments, the steering controller 225 of the master AP causes its transceiver 228 to transmit 1350 the second steered frame including content data to the station device, for example, after an IFS following the end of the slave NDP frame. In some embodiments, time allocated for the second steered frame is longer than time allocated for the first steered frame. In some embodiments, the IFS may be SIFS (e.g., 16 µs) or less. In some embodiments, the master AP and the slave AP may not transmit during the IFS. In some embodiments, the steering controller 225 of the slave AP causes its transceiver 228 to transmit 1352 the second steered frame to the station device, while the master AP transmits 1350 the second steered frame to the station device. In some embodiments, the master AP and the slave AP jointly transmit the second steered frame by applying respective steering vectors indicated in the steering information. In some embodiments, the station device receives and decodes 1358 the joint transmission of the content data.

In some embodiments, the slave AP performs synchronization with the master AP for a joint transmission, for example, for sounding, steering, or both. In one aspect, the slave APs are configured to maintain a reference phase/timing offset (PO_ref and TO_ref, or H_ref) relative to master AP as measured prior to joint sounding, and compare with the phase/timing offset observed prior to steering (PO_new and TO_new, or H_new). Any difference between the two may be compensated during joint steering transmission. However, there may be a potential time lag T1 between measurement of PO_ref, TO_ref, H_ref and actual joint sounding. Likewise, there may be a time lag T2 between measurement of PO_new, TO_new, H_new and actual joint steering. The two lags T1 and T2 may be different. During these lags, the phase-offset and timing-offset relative to master AP may drift (e.g., due to CFO/SFO), because the lags may be unequal. When compensating for phase/timing offsets, the slave APs may account for any drift that might have occurred between the time of measurement of these offsets and the time of joint TX (e.g., by compensating for CFO/SFO accurately from the time of measurement until the joint TX of sounding or steered frame has completed).

In some embodiments, slave APs may refine their CFO/SFO/PO/TO relative to the master AP in various ways. In one approach, slave APs may refine CFO/SFO/PO/TO according to a NDP frame transmitted by the master AP containing a variable number of LTFs (signaled in preamble).

In another approach, slave APs may refine CFO/SFO/PO/TO according to piggy backed training frames. For example, the master AP may designate any frame that it transmits for CFO/SFO/PO/TO refinement. The master AP may indicate in the preamble of the frame that the frame is for the CFO/SFO/PO/TO refinement, for example, according to a BSS color. In one approach, the master AP may embed additional LTFs that may be discontiguous. For example, the master AP transmits two or more LTF symbol groups that are separated by at least a symbol. In one example, a first LTF symbol group is located in a preamble of a data packet, and a second LTF symbol group is located at the end of the data packet, with a spacing corresponding to at least a symbol between the first LTF symbol group and the second LTF symbol group. In one aspect, a payload of the frame for CFO/SFO/PO/TO refinement may be encoded, but the slave APs may still perform CFO/SFO/PO/TO correction or estimation based on the preamble of the frame transmitted by the master AP.

In another approach, slave APs may refine CFO/SFO/PO/TO according to a feedback from station devices. For example, station devices can provide as feedback the measured CFO/SFO/PO/TO (per AP) from the master AP and the slave APs, or a difference of the slave AP's offsets relative to master AP. The station devices can track this via specialized LTFs or pilots in the joint steered frame (e.g., in 80 MHz, 16 pilots can be split among 4 APs with 4 pilots per AP as a simple scheme). In some embodiments, the slave APs receive the estimates from the STAs, and apply the received estimates to re-sync their CFO/SFO/PO/TO relative to master. In one aspect, the estimates from multiple STAs can help improve the quality of the estimation.

In some embodiments, the master AP can only be heard by some of the slave APs while the rest of the slave APs can be heard by the slave APs that hear the master AP. In this case, the scheme can be extended by repeating the slave trigger twice or more. For example, the first transmission may be sent only by the master AP and the slave APs. The slave APs that heard the master AP may join the master AP in the next transmission. For example, the slave AP that has RSSI above a threshold (e.g. −70 dBm) can join the master AP in the subsequent slave trigger transmission. The master AP and the slave AP that heard the master AP may jointly send a second transmission. The slave AP may perform CFO/SFO pre-corrections as described above. Additional APs may hear the joint transmission by the master AP and the slave AP, and the additional APs may participate in the next joint transmission.

In some embodiments, mid-ambles are utilized to allow to correct or adjust synchronization, for example, as described above with respect to FIGS. 10 and 11. In some embodiments, instead of implementing mid-ambles, the slave AP may track the master AP during joint transmission by all APs. The slave AP may track the master AP when the slave AP supports receiving on one channel while transmitting on another. In some embodiments, the transmission channel is used for communication to a station device (e.g., joint AP transmission) while the receiving channel is used by the slave AP for tracking the master AP as well as potentially for receiving new data from the master AP to be transmitted jointly to the station device in either subsequent packets or during the current packet after some fixed or known amount of time greater than the highest decoding delay of all slave AP. In some embodiments, the same reference oscillator may be used for both channels hence tracking on the receiving channel enables the slave AP to remove phase drift on the transmitting channel. Some small error may remain due to uncorrelated random phase noise between the two channels, but this error may be small enough such that the mid-ambles can be omitted or bypassed.

In some embodiments, a first access point (e.g., master AP) includes a first transceiver, a second transceiver, and a steering controller. In some embodiments, the steering controller is configured to cause the first transceiver to communicate with (e.g., transmit to and/or receive from) a second access point (e.g., slave AP) through a first channel frequency, synchronization information for a joint transmission by the first access point and the second access point, and cause the second transceiver to transmit to a station device through a second channel frequency, a portion of a steered frame, while the second access point transmits, through the second channel frequency, the portion of the steered frame to the station device according to the synchronization information for the joint transmission. In some embodiments, the synchronization information includes a carrier frequency offset or a sampling frequency offset. In some embodiments, the second access point is configured to synchronize with the first access point for the joint transmission according to the synchronization information. In some embodiments, the first transceiver and the second transceiver share or are coupled to a same reference clock.

In some embodiments, an access point (e.g., slave AP) includes a first transceiver, a second transceiver, and a steering controller. In some embodiments, the steering controller is configured to cause the first transceiver to receive from another access point (e.g., master AP) through a first channel frequency, synchronization information for a joint transmission by the access point and the another access point, and cause the second transceiver to transmit to a station device through a second channel frequency, a portion of a steered frame according to the synchronization information for the joint transmission, while the another access point transmits, through the second channel frequency, the portion of the steered frame to the station device. In some embodiments, the synchronization information includes a carrier frequency offset or a sampling frequency offset. In some embodiments, the first transceiver and the second transceiver share or are coupled to a same reference clock.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., beamformers and/or beamformees) that can operate within a system or environment. It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for a multiple-input multiple-output (MIMO) communication for a first access point and a second access point, the method comprising:
transmitting, during a first time period before a second time period, a trigger frame to the second access point, the second access point to estimate, according to the trigger frame, synchronization information for a first null data packet announcement;
transmitting, during a third time period between the second time period and the first time period, the first null data packet announcement to a device; and
transmitting, during the second time period after the first time period, by the first access point, a portion of a null data packet to the device, the second access point transmitting the portion of the null data packet to the device, according to the synchronization information for a joint transmission by the first access point and the second access point to the device, the device to determine steering information for the MIMO communication, according to the null data packet.

2. The method of claim 1, wherein the second access point estimates the synchronization information by estimating a carrier frequency offset or a sampling frequency offset with respect to the first access point.

3. The method of claim 1, further comprising:
transmitting, by the second access point during the third time period between the first time period and the second time period, a second null data packet announcement to the device according to the synchronization information, the device to prepare for the null data packet, according to the first and second null data packet announcement transmitted by the first access point and the second access point.

4. The method of claim 1, wherein the second access point transmits the portion of the null data packet during the second time period.

5. A first access point comprising:
a transceiver; and
circuitry configured to:
cause the transceiver to transmit to a second access point during a first time period, information for a joint transmission by the first access point and the second access point to a device, the second access point to estimate synchronization information for the joint transmission according to the information for the joint transmission, and
cause the transceiver to transmit to the device during a second time period after the first time period, a portion of a null data packet, while the second access point transmits the portion of the null data packet to the device according to the synchronization information, the device to determine, according to the null data packet, steering information for a multiple-input multiple-output (MIMO) communication to determine steering vectors for the joint transmission by the first access point and the second access point to the device, wherein the circuitry is further configured to cause the transceiver to:
transmit, during a third time period before the first time period, a trigger frame to the second access point, the second access point to estimate, according to the trigger frame, additional synchronization information for a null data packet announcement, and
transmit, during a fourth time period between the third time period and the first time period, the null data packet announcement to the device, while the second access point transmits the null data packet announcement to the device during the fourth time period according to the additional synchronization information, the device to prepare for the null data packet, according to the null data packet announcement transmitted by the first access point and the second access point.

6. The first access point of claim 5, wherein the circuitry is further configured to cause the transceiver to transmit the information for the joint transmission in a preamble of the null data packet.

7. The first access point of claim 5, wherein the circuitry is further configured to cause the transceiver to transmit the information for the joint transmission in the null data packet announcement, the device to prepare for the null data packet, according to the null data packet announcement.

8. The first access point of claim 7, wherein the circuitry is further configured to cause the transceiver to transmit, during a fifth time period between the first time period and the second time period, a training field to the device, while the second access point transmits the training field to the device during the fourth time period, the device to adjust a gain setting to receive the portion of the null data packet, according to the training field transmitted by the first access point and the second access point.

9. The first access point of claim 5, wherein the circuitry is further configured to cause the transceiver to:
transmit, during the fourth time period between the first time period and the second time period, the null data packet announcement to the device, while the second access point transmits the null data packet announcement to the device during the fourth time period according to the synchronization information, the device to prepare for the null data packet, according to the null data packet announcement transmitted by the first access point and the second access point.

10. The first access point of claim 5, wherein the information for the joint transmission includes two or more long training field (LTF) symbol groups that are separated by at least a symbol.

11. The first access point of claim 5, wherein the second time period is after the first time period.

12. A first access point comprising:
a transceiver; and
circuitry configured to:
cause the transceiver to receive, during a first time period, from a second access point, information for a joint transmission by the first access point and the second access point to a device,
estimate synchronization information for the joint transmission, according to the information for the joint transmission, and
cause the transceiver to transmit, during a second time period after the first time period, a portion of a null data packet to the device according to the synchronization information, while the second access point transmits the portion of the null data packet to the device during the second time period, the device to determine, according to the portion of the null data packet, steering information for a multiple-input multiple-output (MIMO) communication to determine steering vectors for the joint transmission by the first access point and the second access point to the device; and
cause the transceiver to receive, during a third time period before the first time period, a trigger frame to the second access point, the second access point to estimate, according to the trigger frame, additional synchronization information for a null data packet announcement, and
cause the transceiver to transmit, during a fourth time period between the third time period and the first time period, the null data packet announcement to the device.

13. The first access point of claim 12, wherein the circuitry is configured to estimate the synchronization information for the joint transmission by estimating a carrier frequency offset, a sampling frequency offset, a first reference value for a common phase offset, or a second reference value for a timing offset with respect to the second access point.

14. The first access point of claim 12, wherein the circuitry is configured to cause the transceiver to receive the information for the joint transmission in a preamble of the null data packet.

15. The first access point of claim 12, wherein the circuitry is configured to cause the transceiver to receive the information for the joint transmission in the null data packet announcement, the device to prepare for the null data packet, according to the null data packet announcement.

16. The first access point of claim 15, wherein the circuitry is configured to cause the transceiver to transmit, during a fifth time period between the first time period and the second time period, a training field to the device, while the second access point transmits the training field to the device during the third time period, the device to adjust a gain setting to receive the portion of the null data packet, according to the training field transmitted by the first access point and the second access point.

17. The first access point of claim 12, wherein the circuitry is configured to cause the transceiver to:
transmit, during the third time period between the first time period and the second time period, the null data packet announcement to the device, while the second access point transmits the null data packet announcement to the device during the third time period according to the synchronization information, the device to prepare for the null data packet, according to the null data packet announcement transmitted by the first access point and the second access point.

18. The first access point of claim 12, wherein the second time period is after the first time period.

19. A method for a multiple-input multiple-output (MIMO) communication, the method comprising:
transmitting, during a first time period before a second time period, a first null data packet announcement to a device from a first access point;
transmitting by the first access point to a second access point during the second time period, information for a joint transmission by the first access point and the second access point to the device, the second access point to estimate synchronization information for the joint transmission according to the information for the joint transmission; and
transmitting, during a third time period after the second time period and the first time period, by the first access point, a portion of a null data packet to the device, the second access point to transmit the portion of the null data packet to the device, according to the synchronization information for the joint transmission by the first access point and the second access point to the device, the device to determine steering information for the MIMO communication, according to the null data packet.

20. The method of claim 19, wherein the first null data packet announcement and the information for the joint transmission are provided in same transmission.

21. The method of claim 19, wherein the first null data packet announcement and the information for the joint transmission are provided in different transmissions.

22. The method of claim 20, further comprising:
transmitting, by the second access point during the first time period a second null data packet announcement to the device according to the synchronization information, the device to prepare for the null data packet, according to the first and second null data packet announcement transmitted by the first access point and the second access point.

23. A first access point comprising:
a transceiver; and
circuitry configured to:
cause the transceiver to receive, during a first time period, from a second access point, information for a joint transmission by the first access point and the second access point to a device,
estimate synchronization information for the joint transmission, according to the information for the joint transmission, and
cause the transceiver to transmit, during a second time period after the first time period, a portion of a null data packet to the device according to the synchronization information, while the second access point transmits the portion of the null data packet to the device during the second time period, the device to determine, according to the portion of the null data packet, steering information for a multiple-input multiple-output (MIMO) communication to determine steering vectors for the joint transmission by the first access point and the second access point to the device, wherein the circuitry is further configured to:
cause the transceiver to receive, during a third time period before the first time period, from the second access point, a trigger frame, and
estimate additional synchronization information for a null data packet announcement, according to the trigger frame, and cause the transceiver to transmit, during a fourth time period between the third time period and the first time period, the null data packet announcement to the device according to the additional synchronization information, while the second access point transmits the null data packet announcement to the device during the fourth time period, the device to prepare for the null data packet, according to the null data packet announcement transmitted by the first access point and the second access point.

* * * * *